US010572762B2

(12) United States Patent
Kitajima

(10) Patent No.: US 10,572,762 B2
(45) Date of Patent: Feb. 25, 2020

(54) IMAGE PROCESSING METHOD FOR PERFORMING PATTERN MATCHING FOR DETECTING A POSITION OF A DETECTION TARGET

(71) Applicant: CANON KABUSHIKI KAISHA, Tokyo (JP)

(72) Inventor: Hiroshi Kitajima, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 285 days.

(21) Appl. No.: 15/380,849

(22) Filed: Dec. 15, 2016

(65) Prior Publication Data

US 2017/0177970 A1  Jun. 22, 2017

(30) Foreign Application Priority Data

Dec. 17, 2015 (JP) .................. 2015-245758

(51) Int. Cl.
*G06K 9/62* (2006.01)
*G06K 9/46* (2006.01)
*G06K 9/68* (2006.01)
*G06K 9/52* (2006.01)

(52) U.S. Cl.
CPC .......... *G06K 9/4604* (2013.01); *G06K 9/527* (2013.01); *G06K 9/6215* (2013.01); *G06K 9/6857* (2013.01); *G06K 2209/19* (2013.01)

(58) Field of Classification Search
CPC ...... G06T 2207/20016; G06T 7/70–75; G06K 9/6857; G06K 9/62-726; G06K 2209/19
See application file for complete search history.

(56) References Cited

U.S. PATENT DOCUMENTS

| 6,005,978 A * | 12/1999 | Garakani | ............. G06K 9/4609 382/151 |
| 2009/0185715 A1* | 7/2009 | Hofhauser | ........... G06K 9/6206 382/103 |
| 2018/0204090 A1* | 7/2018 | Konishi | .................... G06T 1/20 |

FOREIGN PATENT DOCUMENTS

| JP | 10-21389 A | 1/1998 |
| JP | 2002-230549 A | 8/2002 |

* cited by examiner

*Primary Examiner* — Brian Werner
(74) *Attorney, Agent, or Firm* — Canon U.S.A., Inc. IP Division

(57) ABSTRACT

To each of points at a position corresponding to each of candidate points extracted from a target object image in a layer upper than a target object image, an area including the point at the position corresponding to the candidate point and an area threshold are set. As a result of predicting a degree of similarity, in a case where the degree of similarity has a value smaller than the area threshold, calculation of the degree of similarity is terminated in the middle. In a case where the degree of similarity has a value equal to or greater than the area threshold, calculation of the degree of similarity is continued, and in a case where the degree of similarity has a value greater than the area threshold when calculation of the degree of similarity is completed, a next area threshold is updated with a value greater than the area threshold.

18 Claims, 16 Drawing Sheets

IMAGE PROCESSING METHOD FOR PERFORMING PATTERN MATCHING FOR DETECTING A POSITION OF A DETECTION TARGET

BACKGROUND OF THE INVENTION

Field of the Invention

The present invention relates to image processing for performing pattern matching.

Description of the Related Art

In a field of image processing, it is well known to use pattern matching as a method for detecting a position of a detection target object. A basic method of pattern matching will be described. First, reference information about a detection target object is required to perform pattern matching. The reference information is called a model (or a template). A reference image is prepared by capturing an image of the detection target object in an ideal state, and only an area near the detection target object is extracted from the reference image and used as a model. In an actual process of detecting an object, an image of the detection target object is captured, and a degree of similarity (also referred to as conformity) to the model is calculated at each of positions in the captured image. The pattern matching is a method by which a position of an image, at which the highest degree of similarity is obtained, is regarded as a detected position. That is, the pattern matching is a method for detecting a position, at which the degree of similarity to the model image is the highest, from a target object image.

There is also a case where a degree of dissimilarity (also referred to as nonconformity) is calculated. A low degree of dissimilarity means a high degree of similarity. Thus, when determination of a numerical value is performed, the same determination is to be performed whether to be the degree of similarity or the degree of dissimilarity even though a magnitude relation when determining the numerical value by comparison is inverted. For example, determining whether or not the degree of dissimilarity is below a threshold means determining whether or not the degree of similarity exceeds the threshold. In addition, processing for extracting a position at which the lowest degree of dissimilarity is obtained means processing for extracting a position at which the highest degree of similarity is obtained. Accordingly, description will be given below with use of the degree of similarity.

As a method for calculating the degree of similarity, a plurality of methods are known and examples thereof include a sum of absolute difference (SAD) method, a normalized cross correlation (NCC) method, and a shape pattern matching method. Among them, the shape pattern matching method is strong against an illumination change and the hiding and missing of an object and has a high robustness.

In the shape pattern matching, the degree of similarity between a model and a target object image is calculated on the basis of their shape features. Therefore, in the shape pattern matching, it is necessary to extract a shape feature of an image. As a method for extracting a shape feature, an edge extraction method using a Sobel filter, a Canny filter, or the like is generally known. For each edge point extracted by edge extraction, information of a position (coordinates), a gradient direction of luminance, a gradient magnitude of luminance, or the like is able to be obtained. Then, searching is performed while comparing the model and the target object image in terms of the gradient direction at each edge point (hereinafter, referred to as an edge direction). When a difference in the edge direction between the model and the target object image is small, the degree of similarity is high because the model and the target object image have the same shape feature. When the difference is great, the degree of similarity is low. That is, there is a method for searching, from the target object image, for one having an edge direction similar to that of the model at an edge position similar to that of the model.

As described above, the degree of similarity is calculated at each position of the target object image in the pattern matching, so that the pattern matching needs a high calculation cost and a long processing time. Thus, to increase the processing speed, pyramid searching is performed as described in Japanese Patent Laid-Open No. 10-21389. In the pyramid searching, an image is reduced in a stepwise manner. First, pattern matching is performed for an image which is reduced to the smallest size. Then, searching is performed for an image with a next reduction ratio only in a part around a position at which a target object is detected in the reduced image. By performing the searching with this method repeatedly up to a target object image which is not reduced, it is possible to maintain accuracy while achieving an increase in the processing speed.

A resolution is reduced in the calculation of the degree of similarity for the reduced image so that accuracy is lowered. Therefore, there is a case where a position at which the highest degree of similarity is obtained in the target object image does not have the highest degree of similarity in the reduced image. Then, when a reduced image is searched for, positions at each of which the degree of similarity exceeding a fixed threshold is obtained are all stored as candidate positions and the pyramid searching is performed.

On the other hand, Japanese Patent Laid-Open No. 2002-230549 proposes a method by which, when it is determined that the degree of similarity exceeding a threshold is not obtained during calculation of the degree of similarity, the calculation of the degree of similarity is terminated in the middle. Further, by updating the threshold with the highest degree of similarity obtained during the searching, an effect by terminating the calculation is further enhanced and processing is able to be performed at high speed.

The pattern matching is used for various purposes. Ultra-high processing is required particularly in industry (for example, FA) applications in order to reduce a cycle time of production. Thus, to achieve a higher speed, the method for terminating calculation and updating a threshold as in Japanese Patent Laid-Open No. 2002-230549 is considered to be used also in calculation of the degree of similarity for a reduced image in the pyramid searching as in Japanese Patent Laid-Open No. 10-21389.

However, when updating of a threshold and termination of calculation as in Japanese Patent Laid-Open No. 2002-230549 are performed for a reduced image in the pyramid searching as in Japanese Patent Laid-Open No. 10-21389, there is a possibility that detection of an object fails.

That is, when searching is performed for a reduced image, reliability of the degree of similarity is low because of a reduction in a resolution. Thus, a position at which the degree of the similarity is the highest in the reduced image is not always a position at which the degree of the similarity is the highest in a target object image which is not reduced. Accordingly, in a case where updating of a threshold is performed with the highest degree of similarity calculated in the reduced image, when the position is not a position to be detected, calculation at a different position (correct position) to be detected is terminated and a detection target object may not be detected.

What is needed is to prevent failure in detection of an object while increasing a speed of pattern matching.

SUMMARY OF THE INVENTION

In an image processing method of the present disclosure, a processing unit implements a target object pyramid generation step of generating a target object pyramid which includes a plurality of target object images having different reduction ratios and in which the plurality of target object images are placed hierarchically so that a reduction ratio is increased as being advanced to an upper layer from a lower layer. The processing unit then implements
a first extraction step of performing scanning with a model image on a target object image in a layer upper than a target object image in a bottom layer of the target object pyramid and extracting candidate points at each of which a degree of similarity equal to or greater than a threshold is obtained. Then the processing unit implements
a setting step of setting, in a target object image in a layer lower than the target object image from which the candidate points are extracted, to each of points at a position corresponding to each of the candidate points, an area including the point at the position corresponding to the candidate point and an area threshold set to the area. The image processing method continues with
a second extraction step of performing scanning with a model image in the area and extracting a candidate point at which a degree of similarity equal to or more than the area threshold is obtained, and
at the second extraction step, in a process of extracting the candidate point,
in a case where the degree of similarity has a value smaller than the area threshold, terminates calculation of the degree of similarity,
in a case where the degree of similarity does not have a value smaller than the area threshold, continues calculation of the degree of similarity, and
in a case where the degree of similarity has a value greater than the area threshold when calculation of the degree of similarity is completed, updates the area threshold with the degree of similarity having a value greater than the area threshold.

Further features of the present disclosure will become apparent from the following description of exemplary embodiments with reference to the attached drawings.

DESCRIPTION OF THE EMBODIMENTS

Exemplary embodiments of the invention will be described in detail below with reference to drawings.

First Exemplary Embodiment

Figure 1:
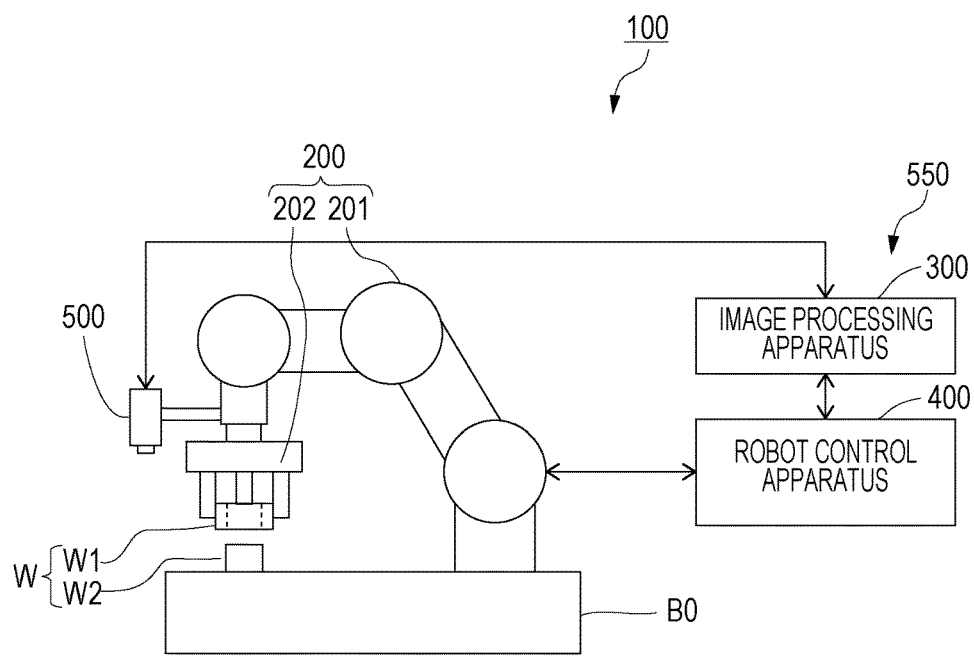
FIG. 1 is an explanatory view illustrating a schematic configuration of a production apparatus according to a first exemplary embodiment.

FIG. 1 is an explanatory view illustrating a schematic configuration of a production apparatus according to a first exemplary embodiment. A production apparatus 100 illustrated in FIG. 1 executes a production method for producing an assembly W by assembling a work (detection target object) W1 to a work (receiving member) W2. The production apparatus 100 includes a robot 200, a camera 500 as an image capturing apparatus mounted on the robot 200, and an image processing apparatus 300 configured to communicate with the camera 500 by a wired or wireless manner. The production apparatus 100 also includes a robot control apparatus 400 connected to the robot 200 and the image processing apparatus 300 via a cable or the like.

The robot 200 has a robot arm 201 of a vertically articulated type, for example, and a robot hand 202 which is an end effector. The robot arm 201 has a plurality of links rotatably or revolvably connected to each other via a plurality of joints. A base end (also referred to as a base end link or a base part) of the robot arm 201 is fixed to an upper surface of a base B0. A robot hand 202 is attached to a leading end (leading end link) of the robot arm 201. The robot hand 202 has a plurality of fingers so as to be able to hold or release the work W1.

The camera 500 is a digital camera and has an image sensor element, for example, such as a CCD (charge coupled device) image sensor or a CMOS (complementary metal oxide semiconductor) image sensor.

The image processing apparatus 300 controls an image capturing operation (for example, image capture timing, a shutter speed, or the like) of the camera 500 and acquires a captured image from the camera 500. The image processing apparatus 300 performs image processing for an image (digital data) and outputs a result thereof to the robot control apparatus 400. Specifically, the image processing apparatus 300 performs pattern matching processing and outputs a result thereof to the robot control apparatus 400. The robot control apparatus 400 controls an operation of the robot 200 on the basis of the result of the image processing performed by the image processing apparatus 300.

The image processing apparatus 300 is arranged outside a housing of the camera 500, but may be arranged inside the housing of the camera 500. An image processing system 550 is configured by the image processing apparatus 300 and the camera 500.

Figure 2:
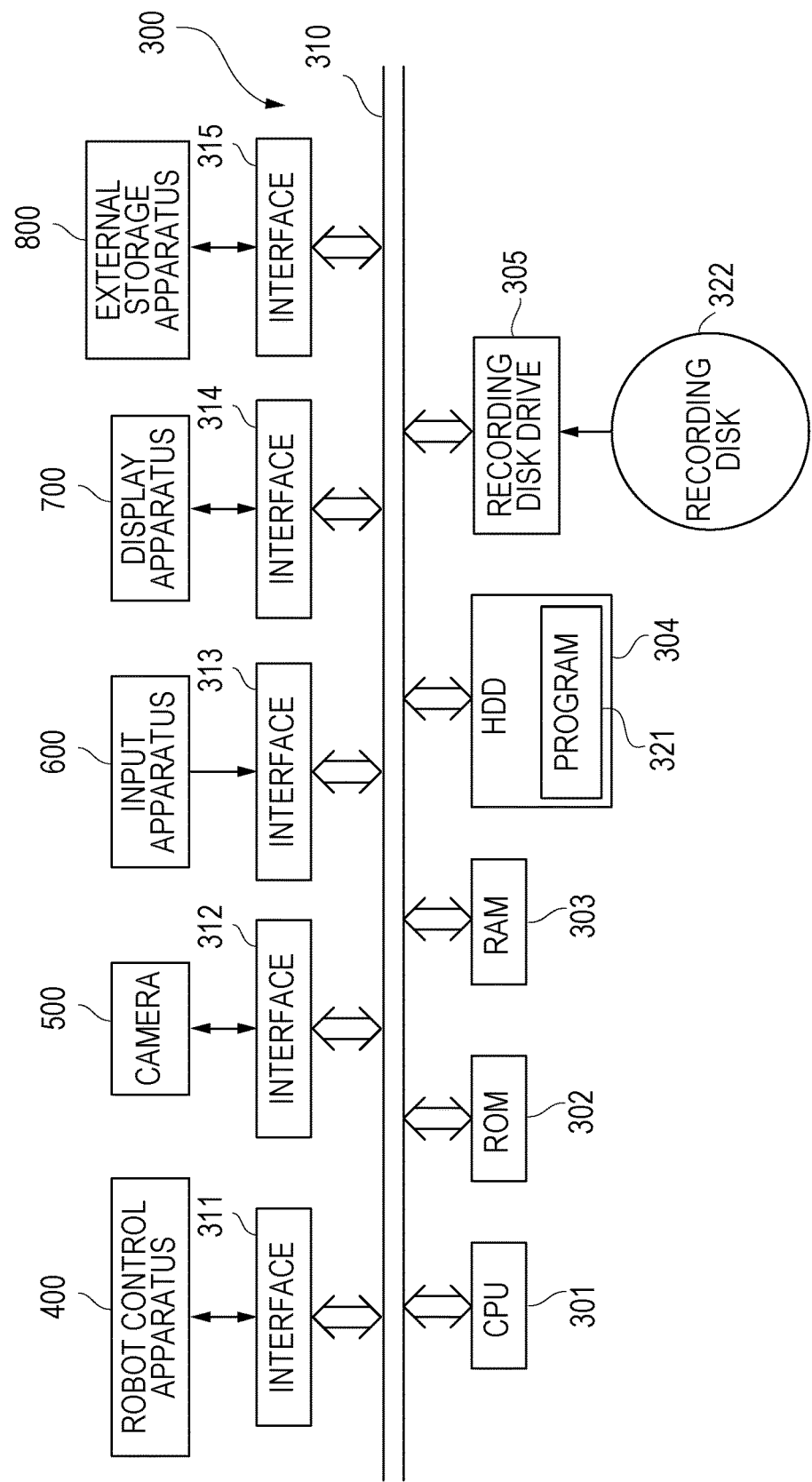
FIG. 2 is a block diagram illustrating a configuration of an image processing apparatus according to the first exemplary embodiment.

FIG. 2 is a block diagram illustrating a configuration of the image processing apparatus 300 according to the first exemplary embodiment. As illustrated in FIG. 2, the image processing apparatus 300 performs image processing, specifically, pattern matching processing, and is constituted by a computer. The image processing apparatus 300 includes a CPU (central processing unit) 301 as a processing unit. The image processing apparatus 300 includes, as a storage unit, a ROM (read only memory) 302, a RAM (random access memory) 303, and a HDD (hard disk drive) 304. The image processing apparatus 300 also includes a recording disk drive 305 and various interfaces 311 to 315.

The CPU 301 is connected to the ROM 302, the RAM 303, the HDD 304, the recording disk drive 305, and the interfaces 311 to 315 via a bus 310. In the ROM 302, a boot program such as BIOS is stored. The RAM 303 is a storage apparatus that temporarily stores various data such as a result of arithmetic processing by the CPU 301. A program 321 is stored (recorded) in the HDD 304. When the CPU 301 reads out and executes the program 321, the processes of an image processing method described below are implemented. The recording disk drive 305 is capable of reading out various data, programs, and the like stored in the recording disk 322.

The interface 311 is connected to the robot control apparatus 400. The CPU 301 transmits a result of the image processing to the robot control apparatus 400 via the bus 310 and the interface 311.

The interface 312 is connected to the camera 500. The CPU 301 transmits a control signal such as a trigger signal to the camera 500 via the bus 310 and the interface 311. The CPU 301 acquires an image signal from the camera 500 via the bus 310 and the interface 311. The acquired image data is stored in the storage apparatus such as the HDD 304 or an external storage apparatus 800 under control of the CPU 301.

The interface 313 is connected to an input apparatus 600 such as a mouse or a keyboard that is operated by an operator to transmit a command according to the operation to the CPU 301. The interface 314 is connected to a display apparatus 700 such as a display that displays an image. The interface 315 is connected to the external storage apparatus 800, for example, a rewritable non-volatile memory such as a USB memory, or an external HDD.

In the present exemplary embodiment, a computer-readable recording medium is the HDD 304, and the program 321 is stored in the HDD 304, but the computer-readable medium is not limited to the HDD 304. The program 321 may be recorded in any recording medium as long as being a computer-readable recording medium. As a recording medium for supplying the program 321, for example, a non-volatile memory, a recording disk, or the like may be used. As specific examples, a flexible disk, a hard disk, an optical disk, a magneto-optical disk, a CD-ROM, a CD-R, a magnetic tape, a ROM, a USB memory, or the like may be used as the recording medium.

A method of pattern matching (image processing method) by the image processing apparatus 300 will described below. The CPU 301 of the image processing apparatus 300 reads out the program 321 from the HDD 304 and executes the program 321, and thereby implements the processes of the image processing method described below. First, processing of generating a model pyramid (shape model) for performing pattern matching processing, that is, a model pyramid generation process will be described.

Figure 3:
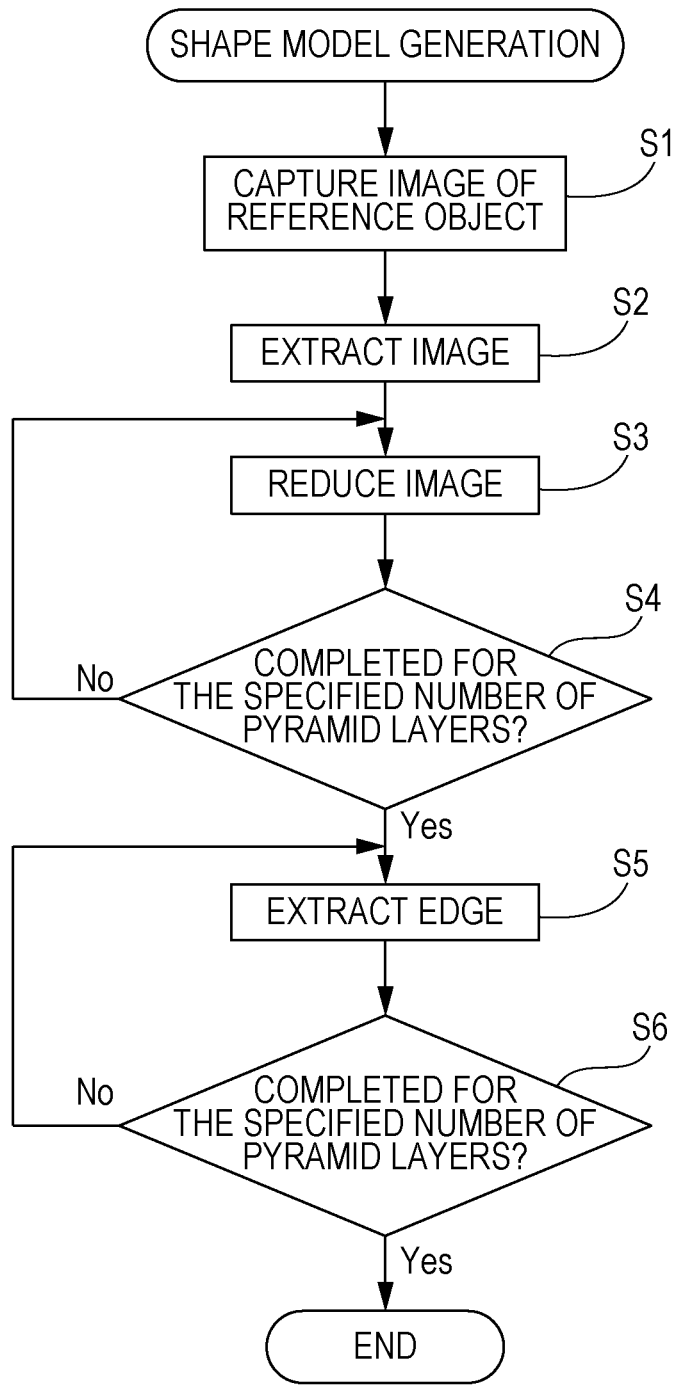
FIG. 3 is a flowchart illustrating model pyramid generation processing in an image processing method according to the first exemplary embodiment.

FIG. 3 is a flowchart illustrating the model pyramid generation process (shape model generation processing) in the image processing method according to the first exemplary embodiment. First, an operator sets a reference object (model object) under an illumination condition and at a position in an ideal state in order to prepare a model image used for pattern matching. The CPU 301 causes the camera 500 to capture an image of the reference object and acquires, from the camera 500, image data that is a reference image in which the reference object is captured (S1). This reference object is the work W1 or a jig having the same shape as that of the work W1. Note that, the reference image may be stored in advance in the storage apparatus such as the HDD 304 or the external storage apparatus 800. In this case, CPU 301 acquires the data of the reference image from the storage apparatus such as the HDD 304 or the external storage apparatus 800.

The CPU 301 displays the reference image on the display apparatus 700, and extracts an image of a rectangular area, which is specified by the operator and contains a part in which the reference object is captured (S2). The specification may be performed, for example, by using the input apparatus 600 such as a mouse and clicking two upper-left and lower-right points of the area containing an image of the reference object in the reference image displayed on the display apparatus 700. At step S2, the CPU 301 specifies positions of the two clicked points (points in the upper left and lower right corners of the rectangular area) and extracts only the image of the rectangular area from the reference image.

Then, the CPU 301 reduces the image of the rectangular area, which is extracted at step S2, for the number of pyramid layers specified by the operator (S3 and S4).

Figure 4:
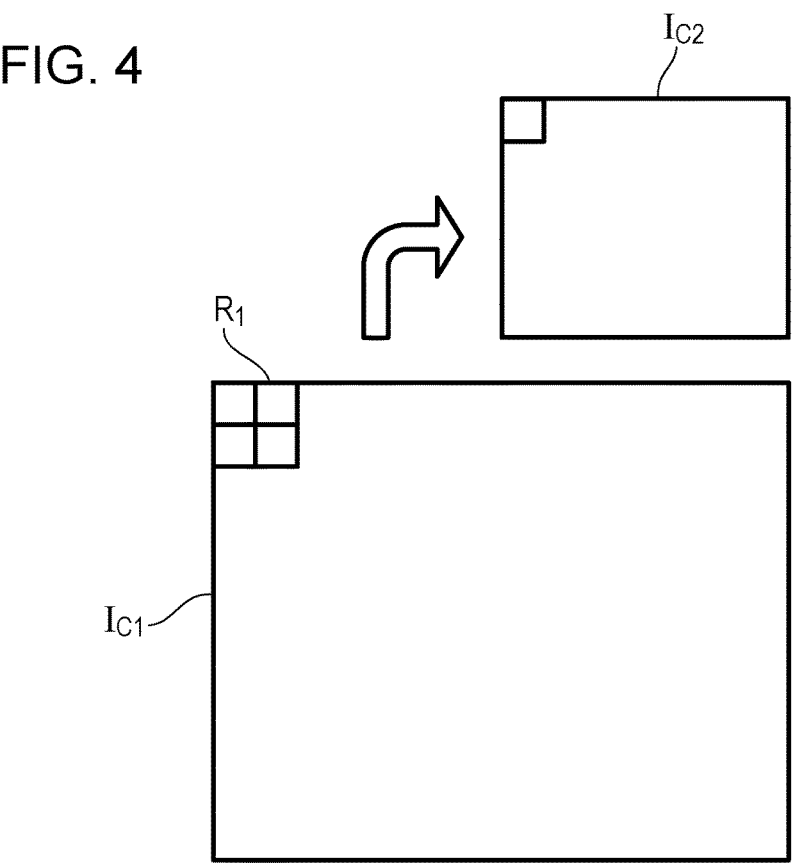
FIG. 4 is an explanatory view when an image is generated by reducing an image of an extracted rectangular area.

FIG. 4 is an explanatory view when an image $I_{C1}$ of the extracted rectangular area is reduced to generate an image $I_{C2}$. First, as illustrated in FIG. 4, a rectangular area $R_1$ with 2×2 pixels is set in an upper left end of the image $I_{C1}$.

The image reduction is performed by reducing the area $R_1$ of 2×2 pixels in the upper left end of the image to one pixel of the reduced image. Specifically, an average value of luminance values of four pixels of 2×2 pixels of the image to be reduced is used as a luminance value of one pixel of the reduced image. The CPU 301 performs the averaging processing for all the pixels of the image to be reduced, to thereby form a reduced image having a half width and a half height of the image to be reduced (S3).

Next, the CPU 301 determines whether or not images are generated for the specified number of pyramid layers (S4). When the reduction processing at step S3 has not been performed the specified number of times (S4: No), the procedure returns to step S3 and the CPU 301 performs reduction processing again with a similar reduction method for an image which is obtained by reduction in previous time. When the image reduction has been performed the specified number of times (S4: Yes), the CPU 301 ends image reduction processing.

Next, the CPU 301 performs edge extraction processing for all images generated at steps S3 and S4 (S5 and S6). Thereby, model images (template images) which are obtained by reduction in a stepwise manner are generated. The CPU 301 places the plurality of model images hierarchically so that the reduction ratio is increased (the resolution is reduced) as being advanced to an upper layer from a lower layer, and generates a model pyramid (shape model) constituted by the plurality of model images.

That is, the CPU 301 generates a plurality of images having different resolutions, with a captured image obtained by capturing an image of the reference object and reduced images obtained by performing the reduction processing for the captured image. Then, the CPU 301 performs edge extraction processing for the plurality of images having different resolutions to generate a plurality of model images forming the model pyramid. The generated model pyramid is stored in the storage apparatus such as the HDD 304 or the external storage apparatus 800.

Here, the edge extraction processing will be described in detail. The CPU 301 calculates an edge strength and an edge direction at each pixel in an image subjected to edge extraction. The edge strength represents magnitude of contrast (steepness of a change in luminance), and when contrast between a pixel of interest and an adjacent pixel is large, the edge strength is also large. The edge direction represents a direction of the contrast and indicates a direction (angle) in which the edge strength of the pixel of interest is maximum. The edge strength is calculated, for example, by using a Sobel filter in an x-axis direction (a horizontal direction of the image) and a y-axis direction (a vertical direction of the image).

Figure 5:
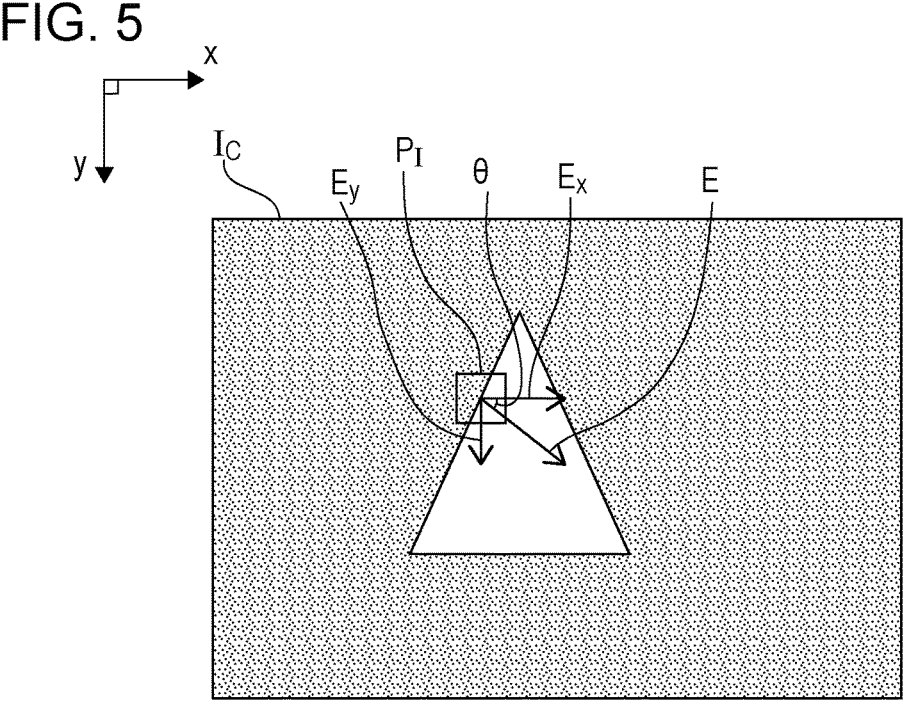
FIG. 5 is a view for explaining an operation of performing edge extraction processing for an image.

FIG. 5 is a view for explaining an operation of performing the edge extraction processing for an image. First, the CPU 301 calculates an edge strength $E_x$ in the x-axis direction and an edge strength $E_y$ in the y-axis direction at a pixel of interest $P_I$ in an image $I_C$. A vector of the edge strength is expressed by ($E_x$, $E_y$).

The CPU 301 calculates the edge strength E of the pixel of interest $P_I$ by a square root of a sum of squares of the strengths $E_x$ and $E_y$ in the respective axis directions, that is, in accordance with a formula (1) described below.

$$E = \sqrt{E_x^2 + E_y^2} \quad (1)$$

Moreover, the CPU 301 calculates an edge direction θ in accordance with a formula (2) described below.

$$\theta = \tan^{-1}\left(\frac{E_y}{E_x}\right) \quad (2)$$

The CPU 301 calculates the edge strength and the edge direction for all pixels of the image $I_C$ with the method described above. The CPU 301 then extracts pixels, at which the edge strength is equal to or greater than a fixed threshold, as edge features (edge points) and generates a model image (template image) $I_T$ including a feature image which is a set of a plurality of edge points.

Figure 6:
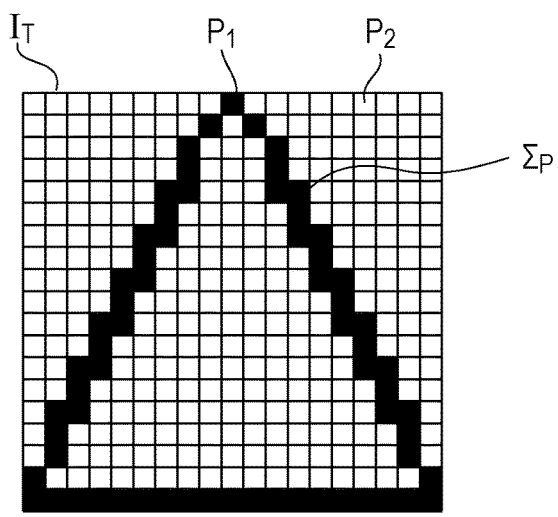
FIG. 6 is a view for explaining a model image.

FIG. 6 is a view for explaining a model image. In FIG. 6, in the model image $I_T$, each valid pixel indicating an edge feature (edge point) is represented in black, and other invalid pixels are represented in white. For holding data of the feature image, data areas of two channels are placed for each pixel of the image, a pixel $P_1$ extracted as the edge feature is set as a valid pixel, and information of the edge strength is stored in a first channel and information of the edge direction is stored in a second channel as illustrated in FIG. 6. An invalid value (for example, 0) is stored in a pixel $P_2$ which is determined as not being an edge feature. A set ΣP of pixels $P_1$ indicating edge points is the feature image.

Note that, a set of two images of an edge strength image in which only the edge strength is stored and an edge direction image in which only the edge direction is stored may be stored as the feature image. In the present exemplary embodiment, the Sobel filter is used in the calculation of the edge strength, but generally known edge extraction filters such as a Canny filter may be used.

Figure 7:
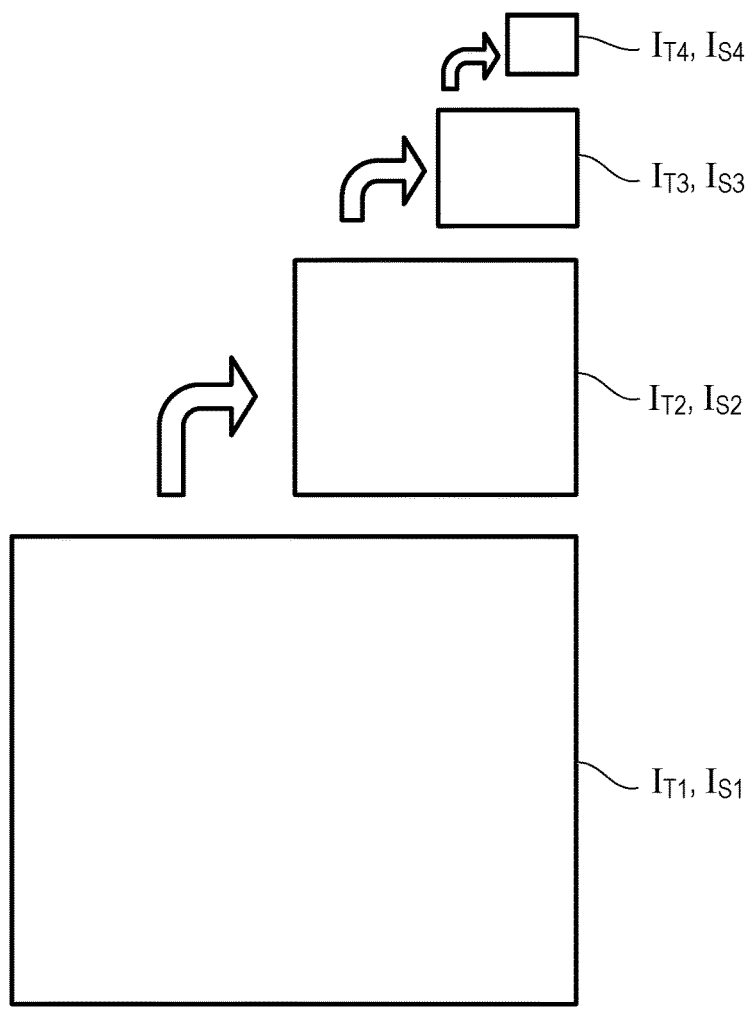
FIG. 7 is a view for explaining a pyramid structure.

FIG. 7 is a view for explaining a pyramid structure. As illustrated in FIG. 7, a plurality of model images $I_{T1}$ to $I_{T4}$ each including a feature image with a different resolution are generated by repeating image reduction processing and edge extraction processing for the multiple number of times. The number of times of the reduction to be performed is able to be specified by the operator as the number of layers of a model pyramid. For example, when the operator specifies four layers as the number of layers of the pyramid, one model image $I_{T1}$ which is not reduced (which has a reduction ratio of 1) and three model images $I_{T2}$ to $I_{T4}$ which are obtained by reduction in a stepwise manner are generated.

With steps S1 to S6 described above, the CPU 301 generates a model pyramid in which the plurality of model images having different reduction ratios are placed hierarchically so that the reduction ratio is increased as being advanced to an upper layer from a lower layer (model pyramid generation step, model pyramid generation processing). The model image in the bottom layer has the reduction ratio of 1, that is, is an image which is not reduced.

In the aforementioned description, a case where, for generating a model pyramid, reduction processing is applied to an image extracted from a captured image, and then edge extraction processing is applied to each image to generate a plurality of model images has been described, but the model pyramid may be generated in other ways. For example, a model pyramid may be generated by applying reduction processing to a model image, which is obtained by applying edge extraction processing to an image extracted from a captured image, and generating a plurality of model images.

In addition, description has been given for a case where the CPU 301 generates a model pyramid in the present exemplary embodiment, but there is no limitation thereto. A model pyramid which has been generated in advance may be acquired.

Figure 8:
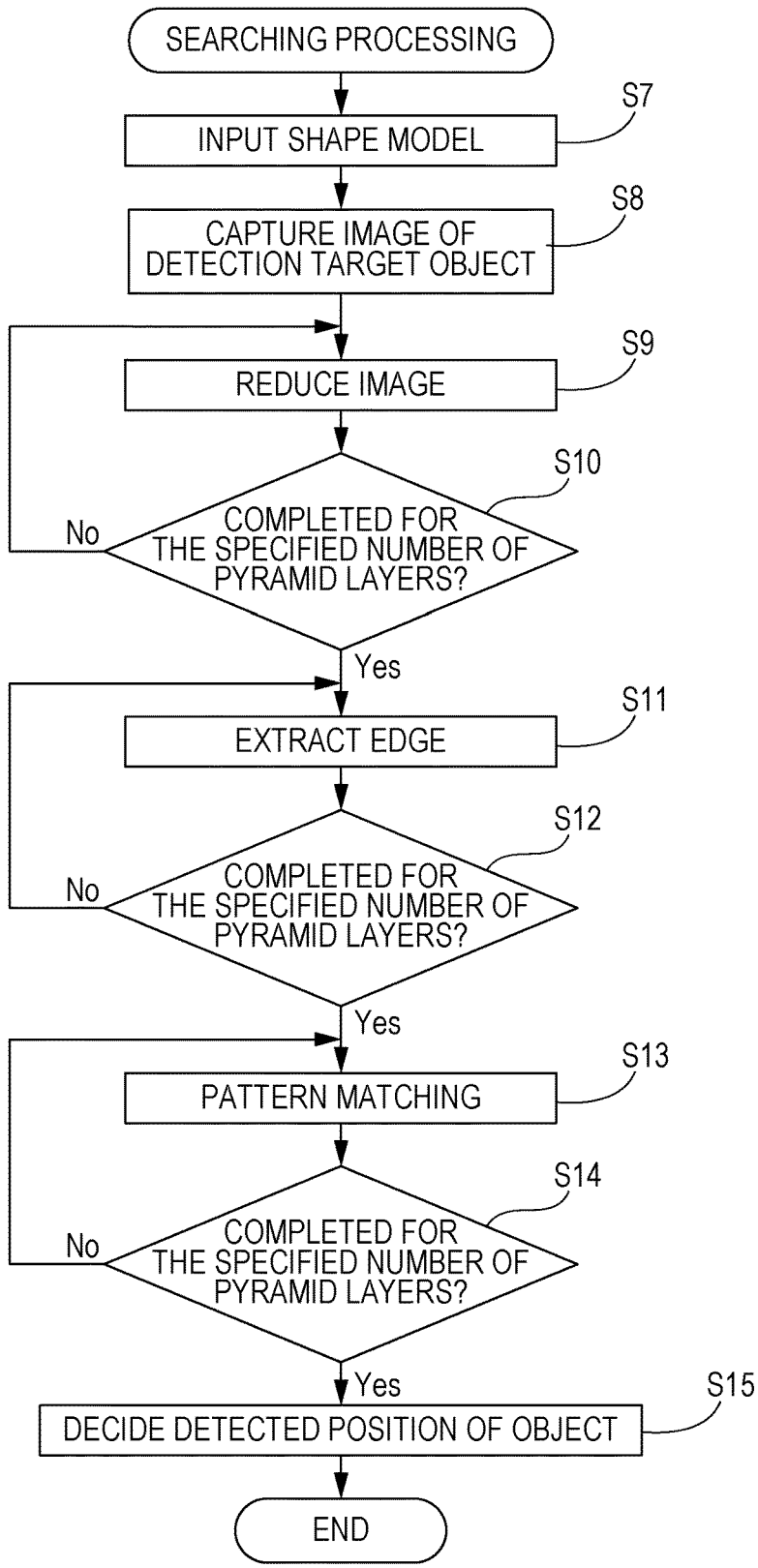
FIG. 8 is a flowchart illustrating searching processing in the image processing method according to the first exemplary embodiment.

Next, a flow of searching processing for actually detecting an object by using the model pyramid generated at steps S1 to S6 will be described. FIG. 8 is a flowchart illustrating the searching processing in the image processing method performed by the image processing apparatus according to the first exemplary embodiment.

First, the CPU 301 inputs data of a model pyramid (shape model) from the storage apparatus such as the HDD 304 or the external storage apparatus 800 in which the data of the model pyramid (shape model) is stored (S7).

Then, the CPU 301 generates a target object pyramid which includes a plurality of target object images having different reduction ratios (having different resolutions) and in which the target object images are placed hierarchically so that the reduction ratio is increased (the resolution is reduced) as being advanced to the upper layer from the lower layer (S8 to S12). In the present exemplary embodiment, the target object pyramid is generated so as to have the same reduction ratio and the same number of layers as those of the model pyramid. That is, when the model pyramid has four layers, the target object pyramid also has four layers.

Further, the same resolution (the same reduction ratio) is set in the same layer of each of the model pyramid and the target object pyramid. For example, as illustrated in FIG. 7, since the model pyramid has four layers, the CPU 301 generates the target object pyramid with four layers formed by the four target object images $I_{S1}$ to $I_{S4}$.

Specifically, first, the CPU 301 causes the camera 500 to capture an image of a detection target object, and inputs a captured image acquired by imaging of the camera 500 (S8: image capturing step).

Next, the CPU 301 reduces the input captured image for the number of layers of the pyramid (S9 and S10). The image reduction is performed in a similar manner to that of steps S3 and S4 in FIG. 3. By the reduction of the captured image, a plurality of images which are obtained by reduction in a stepwise manner are generated.

The CPU 301 then performs the edge extraction processing for all the images generated at steps S9 and S10 (S11 and S12). The edge extraction is performed in a similar manner to that of step S5 in the model pyramid generation process. With the steps S8 to S12 described above, the CPU 301 generates a target object pyramid formed by a plurality of edge feature images which are obtained by reduction in a stepwise manner, that is, a plurality of target object images having different reduction ratios (target object pyramid generation step, target object pyramid generation processing).

That is, the CPU 301 generates the target object pyramid formed by a target object image in the bottom layer, which is an edge image obtained by extracting an edge from the captured image as a result of capturing an image of the detection target object, and target object images in the middle layer and the top layer, which are obtained by reducing the target object image in the bottom layer. Note that, the target object image in the middle layer refers to a target object image having a reduction ratio between the reduction ratio of the target object image in the bottom layer and the reduction ratio of the target object image in the top layer.

Note that, a case where, for generating a target object pyramid, reduction processing is applied to a captured image, and then edge extraction processing is applied to each image to generate a plurality of target object images has been described, but the target object pyramid may be generated in other ways. For example, a target object pyramid may be generated by applying reduction processing to a target object image, which is obtained by applying edge extraction processing to the captured image, and generating a plurality of target object images.

Next, the CPU 301 performs pattern matching processing by using the model pyramid and the target object pyramid such that a model image is searched for from the target object image in the layer with the same resolution by determining a degree of similarity (also referred to as conformity) (S13). The CPU 301 performs this pattern matching processing for all layers (target object images) of the target object pyramid (S14).

Specifically, first, the pattern matching is performed between images with a largest reduction ratio, that is, images in each of the top layers. When the pattern matching is completed, the pattern matching is performed between images with a next largest reduction ratio, that is, images in each of the immediately lower layers. When the pattern matching is finally completed between images which are not reduced, that is, images in the each of the bottom layers, the pattern matching is ended. In this manner, the pattern matching processing is performed in the order from the layer with the low resolution (layer with the high reduction ratio) to the layer with the high resolution (layer with the low reduction ratio).

The CPU 301 decides, as a position of the detection target object, a candidate point at which the highest degree of similarity is obtained among candidate points extracted by the pattern matching processing between the model image and the target object image in each of the bottom layers at steps S13 and S14 (S15: decision step). Note that, when there is eventually one candidate point, the candidate point is decided as the position of the detection target object.

The CPU 301 outputs an image processing result of step S15 to the robot control apparatus 400. The robot control apparatus 400 controls the robot 200 on the basis of the image processing result to implement an assembling step of causing the robot 200 to hold the detection target object, that is, the work W1 so as to be assembled to the work W2 which is a receiving member. As a result, the assembly W is produced.

Figure 9:
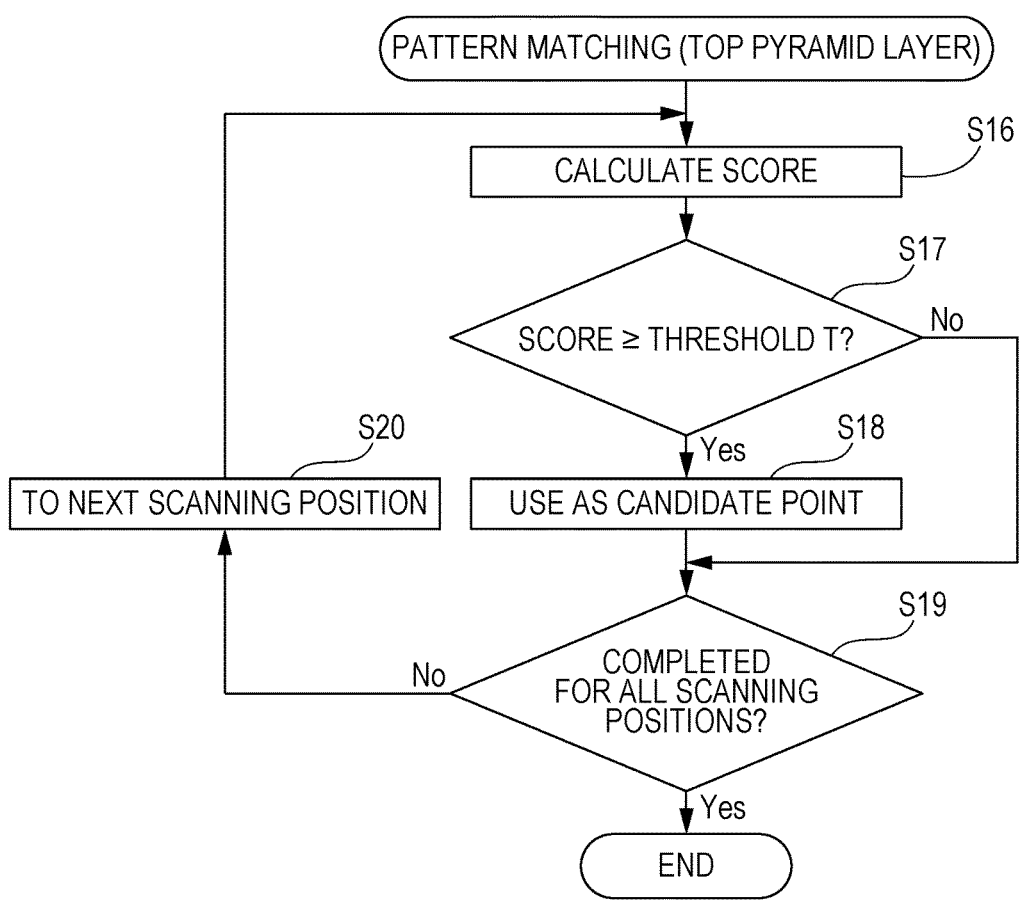
FIG. 9 is a flowchart illustrating pattern matching processing in the image processing method according to the first exemplary embodiment.
Figure 10:
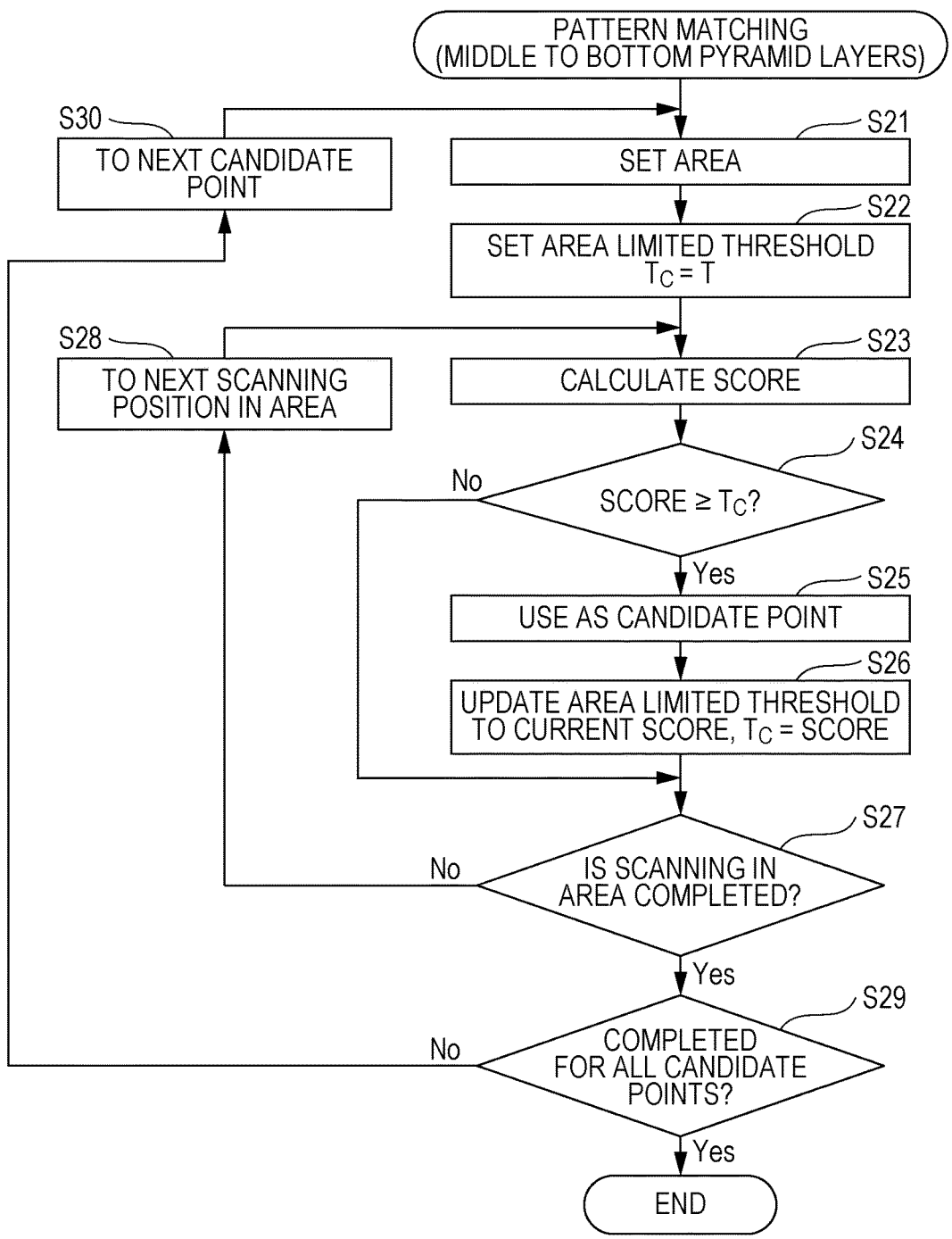
FIG. 10 is a flowchart illustrating the pattern matching processing in the image processing method according to the first exemplary embodiment.
Figure 11:
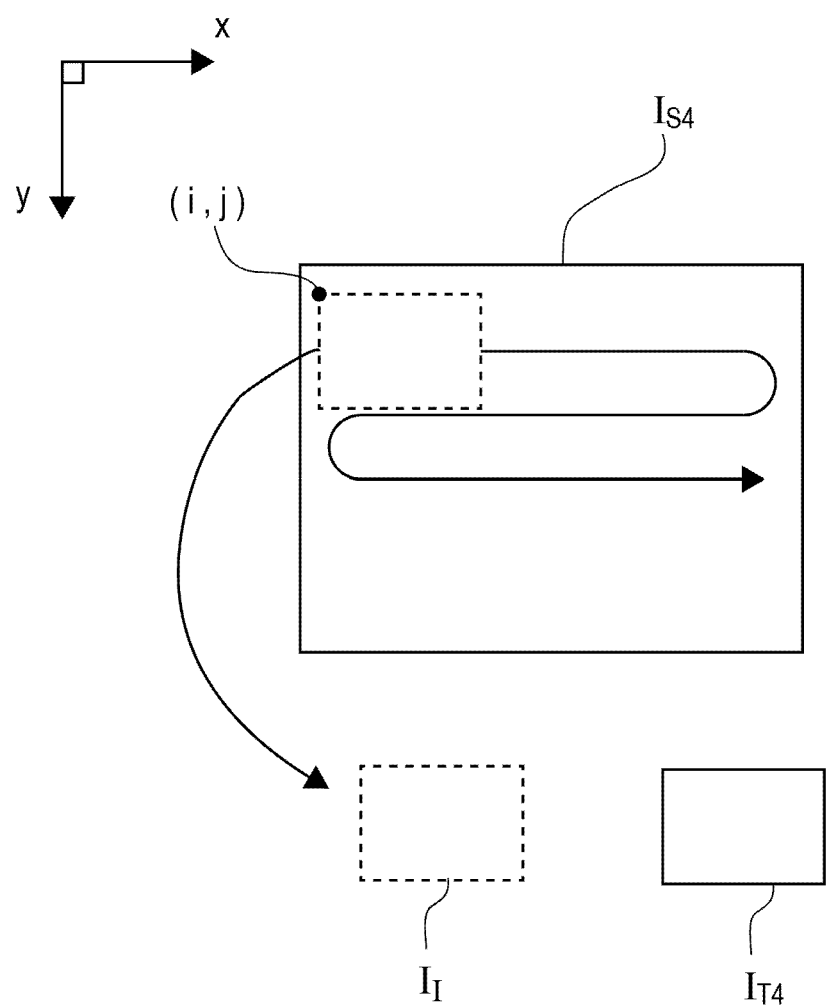
FIG. 11 is a view for explaining the pattern matching processing.

Next, the pattern matching processing at step S13 will be described in detail. FIGS. 9 and 10 are flowcharts illustrating the pattern matching processing in the image processing method performed by the image processing apparatus according to the first exemplary embodiment. Note that, FIG. 9 illustrates the pattern matching processing in the top pyramid layer, and FIG. 10 illustrates the pattern matching processing in the middle to bottom pyramid layers. FIG. 11 is a view for explaining the pattern matching processing.

As illustrated in FIG. 11, the CPU 301 performs scanning with a model image $I_{T4}$ in the top layer of the model pyramid by one pixel at a time in the x-axis and y-axis directions within a target object image $I_{S4}$ in the top layer of the target object pyramid and extracts an image $I_I$ having the same size as that of the model image $I_{T4}$ from the target object image $I_{S4}$. In the present exemplary embodiment, an upper left point of the model image $I_{T4}$ is used as a representative point and a position of the representative point in the target object image $I_{S4}$ is used as a scanning position of the model image $I_{T4}$.

The CPU 301 calculates a score to determine the degree of similarity between the image $I_I$ and the model image $I_{T4}$ (S16). Next, the CPU 301 determines whether or not the score (degree of similarity) obtained as a result of the score calculation is equal to or greater than a threshold T which is set in advance (S17). The threshold T is a fixed value and a value stored in advance in the storage apparatus such as the HDD 304 is used therefor. The degree of similarity is normalized, and the highest degree of similarity is expressed by 1 and the lowest degree of similarity is expressed by 0. That is, images are more similar to each other as the value of the degree of similarity is great.

When determining that the score (degree of similarity) is equal to or greater than the threshold T (S17: Yes), the CPU 301 uses a scanning position (i, j), at which the image $I_I$ is extracted, as a candidate point (S18).

The CPU 301 causes the storage apparatus such as the HDD 304 or the external storage apparatus 800 to store the candidate point. Note that, when determining that the degree of similarity is smaller than the threshold T (S17: No), the CPU 301 determines that there is no candidate point and directly shifts to processing at step S19.

The CPU 301 determines whether or not the score calculation is completed for all scanning positions (S19). When the score calculation is not completed for all scanning positions (S19: No), the CPU 301 performs scanning with (moves) the model image $I_{T4}$ to a next scanning position (S20), extracts the image $I_I$ at that scanning position, and returns to step S16 for performing the score calculation. When the score calculation for all scanning positions in the image $I_{S4}$ is completed (S19: Yes), the processing for the top pyramid layer is ended.

As described above, in the present exemplary embodiment, with steps S16 to S20, the CPU 301 performs scanning with the model image $I_{T4}$ in the top layer for the target object image $I_{S4}$ in the top layer, and extracts candidate points at each of which the score (degree of similarity) equal to or greater than the threshold is obtained (first extraction step, first extraction processing). That is, the first extraction processing for performing scanning with the model image for the entire target object image to extract candidate points is performed for the target object image $I_{S4}$ in the top layer among the target object images $I_{S2}$ to $I_{S4}$ in the layers upper than the target object image $I_{S1}$ in the bottom layer. In the first extraction processing, the calculation of the degree of similarity is not terminated during the calculation.

Next, pattern matching for the middle to bottom pyramid layers will be described with reference to FIG. 10. In the present exemplary embodiment, the same pattern matching processing is performed for the target object images $I_{S1}$ to $I_{S3}$ in the layers lower than the target object image $I_{S4}$ in the top layer.

Figure 12:
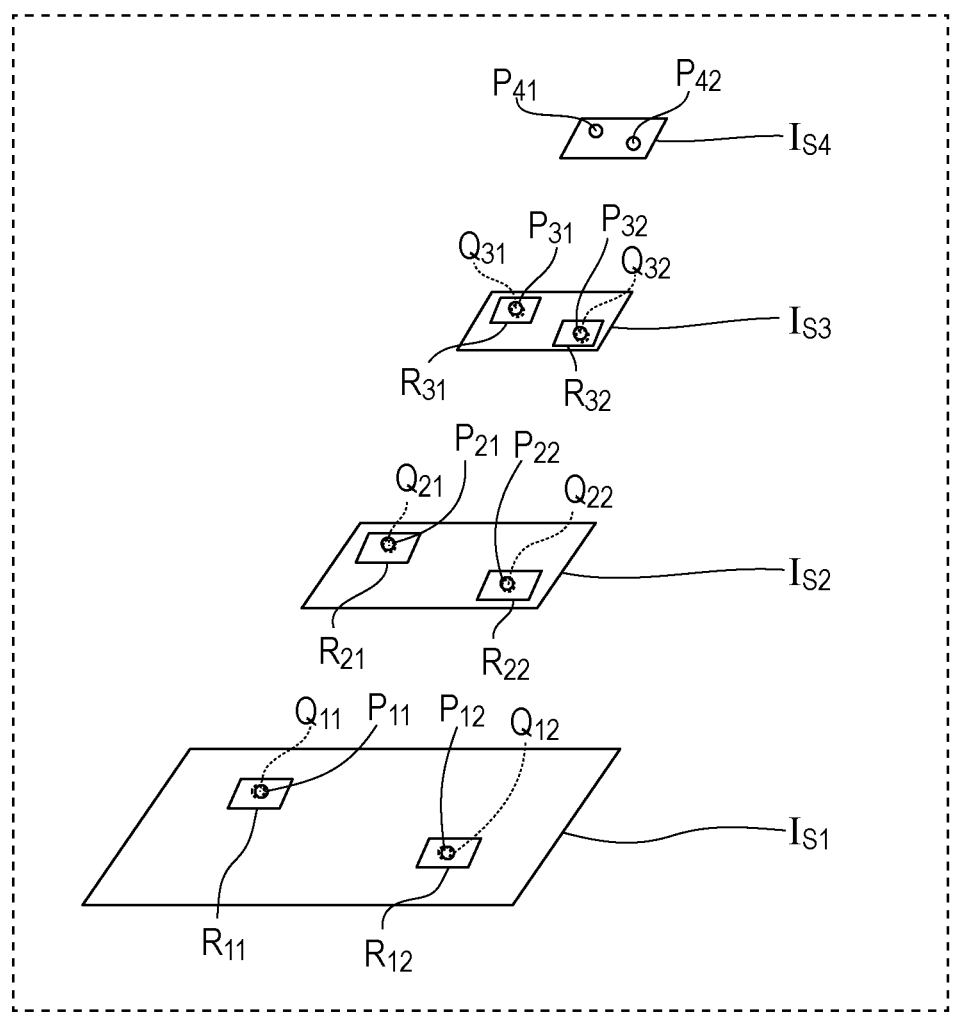
FIG. 12 is a schematic view illustrating a target object pyramid for explaining the pattern matching processing.

FIG. 12 is a schematic view illustrating a target object pyramid for explaining the pattern matching processing. Description will be given by assuming that a plurality of candidate points $P_{41}$ and $P_{42}$ are extracted from the target object image $I_{S4}$.

Here, a candidate point has not been extracted from the target object images $I_{S1}$ to $I_{S3}$ in the layers lower than the target object image $I_{S4}$ from which candidate points have been already extracted. Thus, candidate points are extracted from the target object image $I_{S3}$ in the layer immediately lower than the target object image $I_{S4}$.

First, the CPU 301 sets, in the target object image $I_{S3}$, an area $R_{31}$ which includes a point $Q_{31}$ at a position corresponding to the candidate point $P_{41}$ extracted from the target object image $I_{S4}$ in the layer immediately upper than the target object image $I_{S3}$ (S21: setting step, setting processing). That is, when the pyramid layer is lowered by one layer, the point $Q_{31}$ corresponding to the position (i, j) of the candidate point $P_{41}$ is at a position (2×i, 2×j) having coordinates twice the greater than the coordinates (i, j). The CPU 301 sets the neighboring area $R_{31}$ including 5×5 pixels centered at the corresponding point $Q_{31}$ (2×i, 2×j) in the target object image $I_{S3}$. The area to be set in this manner is not limited to the area including 5×5 pixels, and may be changed in a range of 2×2 pixels to 10×10 pixels, for example.

Next, the CPU 301 sets an initial value of an area threshold (hereinafter, expressed as an area limited threshold $T_C$ for description) which is used limitedly in the area set at step S21, that is, the area $R_{31}$ (S22: setting step, setting processing). In the present exemplary embodiment, the initial value of the area limited threshold $T_C$ is set to the same value as the threshold T.

Next, the CPU 301 performs scanning with a model image $I_{S3}$ (representative point) in the area $R_{31}$ set at step S21, and extracts candidate points at each of which the degree of similarity equal to or greater than the area limit threshold $T_C$ is obtained (S23 to S28: second extraction step, second extraction processing).

Specifically, first, the CPU 301 extracts, from the target object image $I_{S3}$, an image obtained when scanning is performed with the representative point of the model image $I_{S3}$ on one point in the area $R_{31}$. Then, the CPU 301 performs score calculation (calculation of the degree of similarity) between the extracted image and the model image $I_{T3}$ (S23). The score calculation is performed in a similar manner to that of step S16.

The CPU 301 determines whether or not the score (degree of similarity) calculated at step S23 is equal to or greater than the area limited threshold $T_C$ (S24).

When the score is equal to or greater than the area limited threshold $T_C$ (S24: Yes), the CPU 301 uses the scanning position as a candidate point (S25). At this time, the CPU 301 stores this candidate point in the storage apparatus such as the HDD 304 or the external storage apparatus 800. When data of the candidate point for the area $R_{31}$ has been already stored in the storage apparatus, the data is overwritten by data of the new candidate point. That is, when a score greater than the area limited threshold $T_C$ is calculated multiple times through scanning (searching) in one area $R_{31}$, the candidate point which has been stored is overwritten each time.

When the calculated score has the same value as the area limited threshold $T_C$ and data of the candidate point for the area $R_{31}$ has been already stored in the storage apparatus, data of the new candidate point may be stored additionally without deleting the data of the candidate point which has been already stored. That is, a plurality of candidate points having the same score are extracted from one area $R_{31}$.

The CPU 301 updates the area limited threshold $T_C$ with the calculated score (degree of similarity) (S26). As a result, the value of the area limited threshold $T_C$ increases for each updating. That is, the area limited threshold $T_C$ is updated to the value greater than the initial value. Note that, when the score has the same value as the area limited threshold $T_C$ as a result of the determination at step S24, updating does not need to be performed. In any case, when the degree of similarity for which the calculation is completed has a value greater than the current area limited threshold $T_C$, the CPU 301 updates the area limited threshold $T_C$, which is used for a next scanning position, with the degree of similarity having a value greater than the current area limited threshold $T_C$.

When the calculated score is below the area limited threshold $T_C$ (S24: No), the CPU 301 determines that there is no candidate point and shifts to next processing of step S27.

Next, the CPU 301 determines whether or not scanning (searching) in the area $R_{31}$ is completed (S27).

When determining that scanning in the area $R_{31}$ is not completed (S27: No), the CPU 301 moves the model image $I_{T3}$ to a next scanning position in the area $R_{31}$ (S28), and returns to the processing of step S23.

When determining that scanning in the area $R_{31}$ is completed (S27: Yes), the CPU 301 determines whether or not the processing is completed for all candidate points (S29). When determining that the processing is not completed (S29: No), the CPU 301 selects a next candidate point, for example, the candidate point $P_{42}$ (S30), and returns to the processing of step S21.

That is, in a similar manner also for the next candidate point $P_{42}$, the CPU 301 sets an area $R_{32}$ which includes a point $Q_{32}$ at a position corresponding to the candidate point $P_{42}$ in the target object image $I_{S3}$ (S21), and sets the area limited threshold $T_C$ which is used limitedly in the area $R_{32}$ (S22). An initial value of the area limited threshold $T_C$ in this case is set (initialized) to the same value as the threshold T. The CPU 301 then performs processing of following steps S23 to S28. When determining that scanning in the area $R_{32}$ is completed at step S27, the CPU 301 determines whether or not the processing is completed for all candidate points (S29). When determining that the processing is completed (S29: Yes), the CPU 301 ends the pattern matching processing in the current layer, that is, the target object image $I_{S3}$.

In this manner, the CPU 301 sets, in the target object image $I_{S3}$, the areas $R_{31}$ and $R_{32}$ and the area limited thresholds $T_C$ used limitedly in the areas $R_{31}$ and $R_{32}$ respectively to points at positions corresponding to the candidate points $P_{41}$ and $P_{42}$ extracted from the target object image $I_{S4}$, that is, the points $Q_{31}$ and $Q_{32}$. Then, the CPU 301 performs scanning with the model image $I_{S3}$ for the areas $R_{31}$ and $R_{32}$, and extracts candidate points $P_{31}$ and $P_{32}$, at each of which the degree of similarity equal to or greater than the area limited threshold $T_C$ is obtained.

Note that, even when the areas $R_{31}$ and $R_{32}$ are overlapped with each other, for example, the degree of similarity is calculated in a duplicated manner for the overlapping part by performing scanning in the areas $R_{31}$ and $R_{32}$.

The pattern matching processing in the target object image $I_{S3}$ in the remaining middle layer and the pattern matching processing in the target object image $I_{S1}$ in the remaining bottom layer are also performed similarly.

That is, the CPU 301 sets, in the target object image $I_{S3}$, areas $R_{21}$ and $R_{22}$ and the area limited thresholds $T_C$ respectively to points $Q_{21}$ and $Q_{22}$ at positions corresponding to the candidate points $P_{31}$ and $P_{32}$ extracted from the target object image $I_{S3}$ in the layer immediately upper than the target object image $I_{S3}$. Then, the CPU 301 performs scanning with the model image $I_{T2}$ in the areas $R_{21}$ and $R_{22}$, and extracts candidate points $P_{21}$ and $P_{22}$, at each of which the degree of similarity equal to or greater than the area limited threshold $T_C$ is obtained. Similarly, the CPU 301 sets, in the target object image $I_{S1}$, areas $R_{11}$ and $R_{12}$ and the area limited thresholds $T_C$ respectively to points $Q_{11}$ and $Q_{12}$ at positions corresponding to the candidate points $P_{21}$ and $P_{22}$ extracted from the target object image $I_{S2}$ in the layer immediately upper than the target object image $I_{S1}$. Then, the CPU 301 performs scanning with the model image $I_{T1}$ in the areas $R_{11}$ and $R_{12}$, and extracts candidate points $P_{11}$ and $P_{12}$, at each of which the degree of similarity equal to or greater than the area limited threshold $T_C$ is obtained.

As described above, as the processing of steps S13 to S14 illustrated in FIG. 8, the processing of steps S16 to S20 of FIG. 9 is performed in the top pyramid layer, and the processing of steps S21 to S30 of FIG. 10 is performed in the middle to bottom pyramid layers.

The CPU 301 decides, as a detected position of an object in the target object image $I_{S1}$, a position of the candidate point having a highest score value of the candidate points $P_{11}$ and $P_{12}$ extracted from the bottom layer at step S15.

Next, processing of score calculation (calculation of the degree of similarity) at step S16 of FIG. 9 and step S23 of FIG. 10 will be described in detail.

Figure 13:
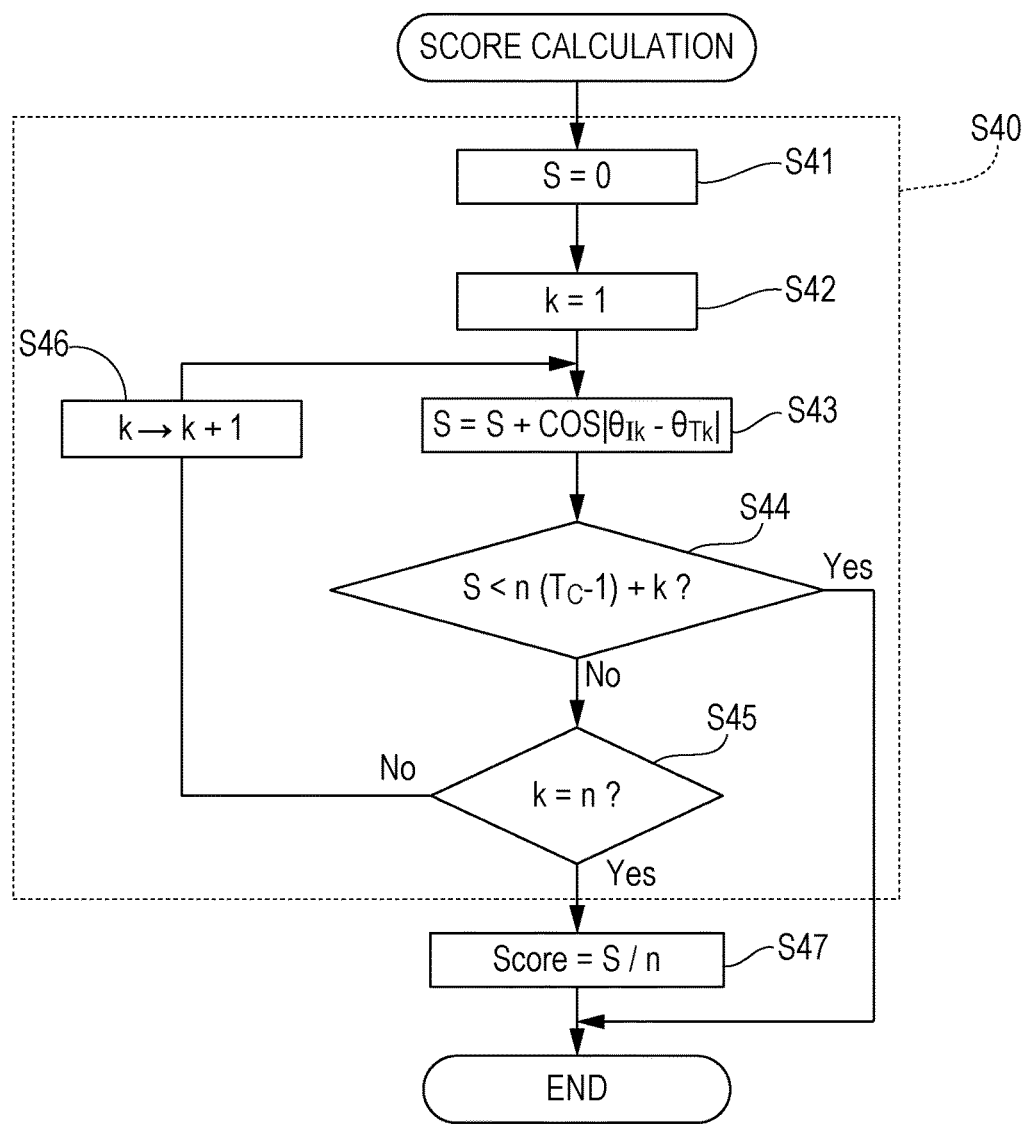
FIG. 13 is a flowchart illustrating score calculation processing in the image processing method according to the first exemplary embodiment.

FIG. 13 is a flowchart illustrating score calculation processing (degree of similarity calculation processing) in the image processing method performed by the image processing apparatus according to the first exemplary embodiment. First, the CPU 301 calculates a local score (degree of local similarity), which is associated with an edge point in a feature image in a model image and a point, in a target object image, at a position corresponding to the point of the feature image in the model image, for all points in the feature image. Then, the CPU 301 calculates a sum S of all degrees of local similarity (a sum of scores) (S40). That is, the CPU 301 calculates the local score (degree of local similarity) between a pixel of the feature image in the model image and a pixel of the extracted image extracted from the target object image, both of which have the same coordinates, and calculates a sum of all the local scores.

The CPU 301 then calculates the final score (degree of similarity) by normalizing the sum of scores, which is calculated at step S40 (S47). For example, in a case where the number of edge points (pixels) that the feature image in the model image has is n, the normalization is performed by dividing the sum of local scores by n.

Next, the concept of the processing at steps S40 and S47 will be described below. A following calculation formula (3) is used to obtain the degree of similarity by pattern matching.

$$R_{IJ} = \frac{1}{n}\sum_{k=1}^{n} \cos|\theta_{Ik} - \theta_{Tk}| \qquad (3)$$

$R_{IJ}$: degree of similarity at position (i, j) in image
n: the number of edge points
$\theta_{Ik}$: edge direction in target object image
$\theta_{Tk}$: edge direction in model image The local score for one edge point is calculated by obtaining cosine (cosine value) of a difference in an edge direction between one edge point in the feature image included in the model image and a point, with the same coordinates as those of the one edge point in the feature image, in the target object image. Such processing is performed for all edge points in the feature image included in the model image to thereby calculate a sum of local scores at all edge points. By dividing the sum of the local scores by the number n of edge points of the model image, the final score (degree of similarity) which is normalized to a value in a range from 0 to 1 is obtained. The highest degree of similarity is expressed by 1 and the lowest degree of similarity is expressed by 0. In the formula (3) described above, the position (i, j) in the image indicates a position in the target object image $I_S$ obtained by extracting an image with a size corresponding to the size of the model image $I_{T4}$ from the target object image $I_{S4}$ illustrated in FIG. 11, for example, and represents a candidate point.

A specific method for calculating a sum of scores at S40 will be described below. First, the CPU 301 initializes a value of the score sum S to 0 (S41). The CPU 301 assigns serial numbers from 1 to n to edge points in the feature image in the model image, and sets a variable k to 1 to calculate (integrate) the local scores starting from the serial number of 1 to the serial number of n (S42).

Next, the CPU 301 calculates a local score between an edge point in the feature image and a point at a position corresponding to the edge point in the feature image in the target object image, and adds the local score to the score sum S (S43).

Herein, the edge direction at the edge point (pixel) assigned with a serial number k in the feature image is denoted by $\theta_{Tk}$. Moreover, in the target object image, the edge direction at a point (pixel) at a position corresponding to the edge point in the feature image, that is, at the same coordinates as the coordinates of the edge point with the serial number k is denoted by $\theta_n$.

The local score is obtained by calculating cosine of an angle $|\theta_{Ik}-\theta_{Tk}|$ formed by the edge direction $\theta_{Tk}$ and the edge direction $\theta_{Ik}$. That is, at step S42, the CPU 301 calculates a local score $f_k$ according to a following formula (4) and adds the local score $f_k$ to the score sum S.

$$f_k = \cos|\theta_{Ik} - \theta_{Tk}| \qquad (4)$$

Next, with use of a following formula (5), the CPU 301 determines whether or not the score calculation is able to be terminated (S44). That is, the CPU 301 predicts whether or not the degree of similarity has a value smaller than the area limited threshold $T_C$ on the basis of an interim result of the calculation of the degree of similarity during the calculation of the degree of similarity.

$$S < n \times (T_C - 1) + k \qquad (5)$$

When the formula (5) is satisfied (S44: Yes), that is, when the CPU 301 predicts that the degree of similarity has a value smaller than the area limited threshold $T_C$, the CPU 301 terminates the calculation of the degree of similarity (score calculation) in the middle and the procedure is ended.

When the formula (5) is not satisfied (S44: No), that is, when the CPU 301 is not able to predict that the degree of similarity has a value smaller than the area limited threshold $T_C$, the CPU 301 determines whether the score sum for all edge points in the feature image in the model image is calculated (S45). When the calculation is not completed for all edge points (S45: No), the CPU 301 increments the serial number k of the edge point by one (S46) to perform the processing of steps S43 to S45. That is, when the CPU 301 is not able to predict that the degree of similarity has a value smaller than the area limited threshold $T_C$, the CPU 301 continues the calculation of the degree of similarity.

When the calculation is completed for all edge points (S45: Yes), the CPU 301 normalizes the score sum with the number of all edge points in the feature image in the model image, to thereby calculate a final score (degree of similarity) at a certain scanning position (S47). Note that, when terminating the calculation in the middle (S44: Yes), the CPU 301 sets the score (degree of similarity) to a value smaller than the threshold T, for example, 0. As a result, a feature point is not extracted for the scanning position at which the calculation of the degree of similarity is terminated in the middle.

The formula (5) is used for terminating the calculation in a case where it is determined that the final score does not exceed the threshold $T_C$ even when all local scores $f_k$ for the number (n−k) of remaining edge points are 1.0 (maximum local score) at a time when the calculation up to the serial number k of the edge point is completed.

As described above, according to the first exemplary embodiment, when the pattern matching processing is performed in the middle and bottom pyramid layers, the area limited threshold $T_C$ which is used for each area to terminate the score calculation is updated. Thus, it is possible to shorten a processing time required for the pattern matching by terminating the calculation of the degree of similarity and updating the area limited threshold used for determining whether or not to terminate the calculation.

Further, since it is possible to determine whether to terminate the score calculation in accordance with the area limited threshold $T_C$ which is set separately for each area without being affected by the degree of similarity calculated in other areas, thus making it possible to prevent failure in detection of an object.

Note that, a case where termination of the calculation of the degree of similarity and updating of the area limited threshold $T_C$ are performed for all the target object images $I_{S1}$ to $I_{S3}$ other than the target object image $I_{S4}$ in the top layer has been described in the first exemplary embodiment, but there is no limitation thereto.

For example, termination of the calculation of the degree of similarity and updating of the area limited threshold $T_C$ may be performed only for the target object image $I_{S1}$ in the bottom layer, or termination of the calculation of the degree of similarity and updating of the area limited threshold $T_C$ may be performed only for the target object image $I_{S2}$ or the target object image $I_{S3}$ in the middle layer. In this case, for the target object image in the layer (hierarchy) in which termination of the calculation of the degree of similarity and updating of the area limited threshold $T_C$ are not performed, it is only required that the degree of similarity is determined with the threshold T to extract a candidate point. Further, for the target object image in the layer (hierarchy) in which termination of the calculation of the degree of similarity and updating of the area limited threshold $T_C$ are not performed, an area including a point corresponding to the candidate point in the upper layer may be set to perform scanning with the model image only in the area. Of course, it is possible to reduce the processing time more effectively when termination of the calculation of the degree of similarity and updating of the area limited threshold $T_C$ are performed for all the target object images $I_{S1}$ to $I_{S3}$ other than the target object image $I_{S4}$.

When the area limited threshold $T_C$ is updated, that is, when the degree of similarity exceeds the area limited threshold $T_C$, data of a candidate point in the corresponding area is updated (data is overwritten), but there is no limitation thereto and the data of the candidate point which is registered before may be kept. Of course, updating of data of the candidate point needs less amount of data and makes it possible to reduce the processing time effectively.

Though a case where the degree of similarity (also referred to as conformity) is calculated has been described in the first exemplary embodiment, a degree of dissimilarity (also referred to as nonconformity) may be calculated. In this case, as a value of the degree of dissimilarity is small, high similarity is achieved.

Accordingly, extraction of a candidate point at which the degree of similarity equal to or greater than a threshold is achieved is the same as extraction of a candidate point at which the degree of dissimilarity equal to or smaller than the threshold is achieved. Similarly, extraction of a candidate point at which the degree of similarity equal to or greater than an area limited threshold is achieved is the same as extraction of a candidate point at which the degree of dissimilarity equal to or smaller than the area limited threshold is achieved. Whether to terminate calculation of the degree of similarity in the middle is determined by predicting whether or not the degree of similarity has a value smaller than the area limited threshold. Meanwhile, in the case of the degree of dissimilarity, the determination is performed by predicting whether or not the degree of dissimilarity has a value greater than the area limited threshold. Similarly, while an area limited threshold used for a next scanning position is updated with the degree of similarity having a value greater than the area limited threshold, in the case of the degree of dissimilarity, the area limited threshold used for a next scanning position is updated with the degree of dissimilarity having a value smaller than the area limited threshold.

In this manner, determination according to the degree of dissimilarity (nonconformity) is equal to determination according to the degree of similarity (conformity), and even when the degree of dissimilarity is used, the same is provided as when the degree of similarity is used (even though whether to be greater or smaller than the threshold is determined in an inverted manner).

Second Exemplary Embodiment

Next, an image processing method of a second exemplary embodiment will be described. A configuration of a production apparatus and a configuration of an image processing apparatus in the second exemplary embodiment are similar to those of the first exemplary embodiment. A pattern matching method (image processing method) performed by the image processing apparatus 300 will be described below. The CPU 301 of the image processing apparatus 300 reads out the program 321 from the HDD 304 and executes the program 321, and thereby implements the processes of the image processing method described below. First, processing of generating a model pyramid (image model) for performing pattern matching processing will be described.

Though description has been given for a case where a pyramid model is generated by reducing an image extracted from a captured image and performing edge extraction in the first exemplary embodiment, a model pyramid is generated by reducing an image extracted from a captured image in the second exemplary embodiment. That is, only reduction of an image is performed and edge extraction is not performed.

Figure 14:
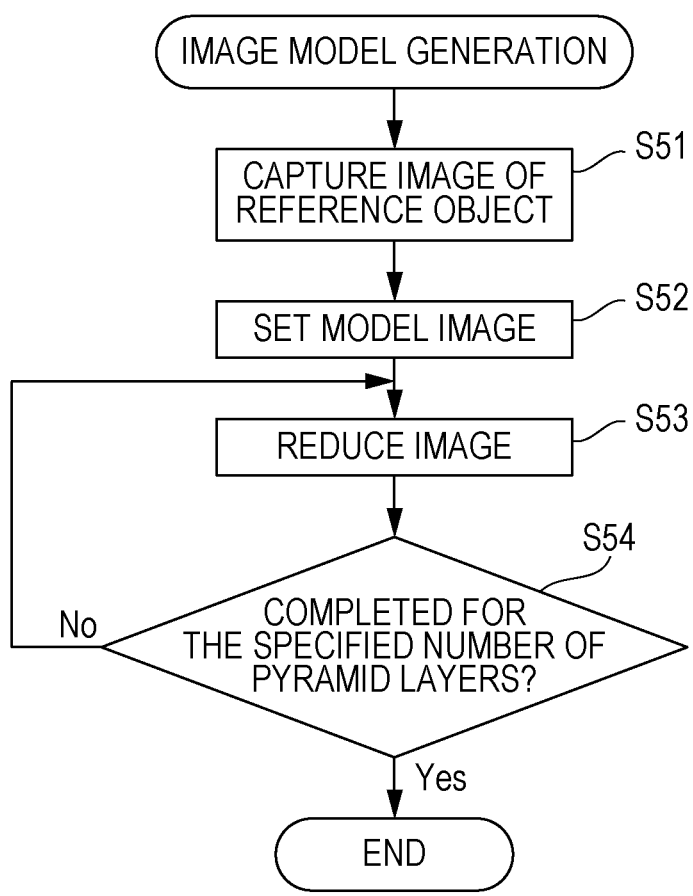
FIG. 14 is a flowchart illustrating model pyramid generation processing in an image processing method according to a second exemplary embodiment.

FIG. 14 is a flowchart illustrating a model pyramid generation process (image model generation processing) in the image processing method performed by the image processing apparatus according to the second exemplary embodiment.

First, an operator sets a reference object (model object) under an illumination condition and at a position in an ideal state in order to prepare a model image used for pattern matching. The CPU 301 causes the camera 500 to capture an image of the reference object and acquires, from the camera 500, image data that is a reference image in which the reference object is captured (S51). Note that, the reference image may be stored in advance in the storage apparatus such as the HDD 304 or the external storage apparatus 800. In this case, the CPU 301 acquires the data of the reference image from the storage apparatus such as the HDD 304 or the external storage apparatus 800.

The CPU 301 displays the reference image on the display apparatus 700, and extracts an image of a rectangular area, which is specified by the operator and contains a part in which the reference object is captured, and sets the image as a model image which is not reduced (S52). The specification may be performed, for example, by using the input apparatus 600 such as a mouse and clicking two upper-left and lower-right points of the area containing an image of the reference object in the reference image displayed on the display apparatus 700. At step S52, the CPU 301 specifies positions of the two clicked points (points in the upper left and lower right corners of the rectangular area) and extracts only the image of the rectangular area from the reference image.

Then, the CPU 301 reduces the image (model image) of the rectangular area, which is extracted at step S52, for the number of pyramid layers specified by the operator (S53 and S54). The image reduction is performed in a similar manner to that of step S3 of FIG. 3 described in the first exemplary embodiment.

That is, the CPU 301 reduces the model image at step S53 and determines whether model images are generated for the specified number of pyramid layers at S54.

When the reduction processing at step S53 has not been performed the specified number of times (S54: No), the procedure returns to step S53 and the CPU 301 performs reduction again with a similar reduction method for an image which is obtained by reduction in previous time. When the image reduction has been performed the specified number of times (S54: Yes), the CPU 301 ends image reduction processing.

With steps S51 to S54 described above, the CPU 301 generates a model pyramid in which the plurality of model images having different reduction ratios are placed hierarchically so that the reduction ratio is increased as being advanced to the upper layer from the lower layer (model pyramid generation step, model pyramid generation processing). The model image in the bottom layer has the reduction ratio of 1, that is, is an image which is not reduced. The generated model pyramid is stored in the storage apparatus such as the HDD 304 or the external storage apparatus 800.

Figure 15:
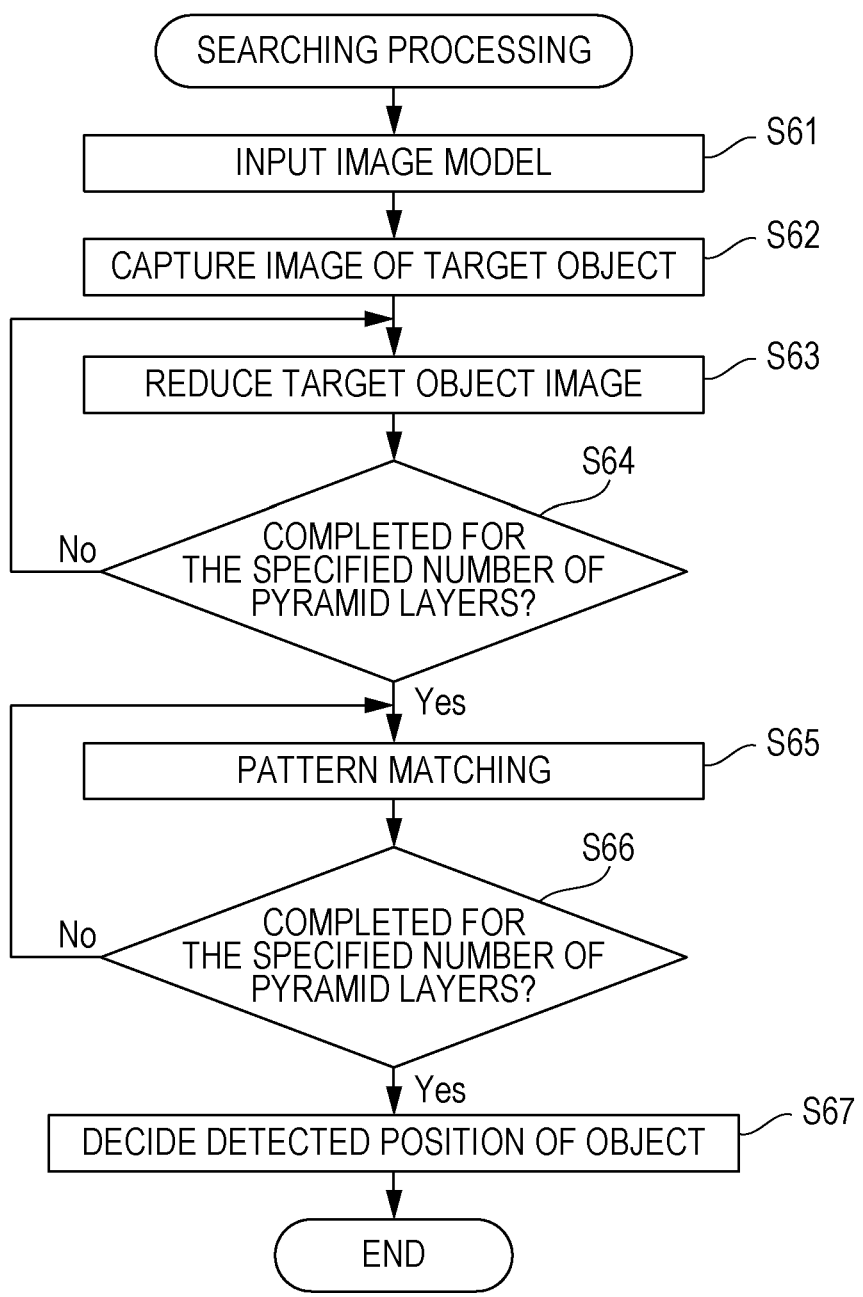
FIG. 15 is a flowchart illustrating searching processing in the image processing method according to the second exemplary embodiment.

Next, a flow of searching processing for actually detecting an object by using the model pyramid generated at step S51 to S54 will be described. FIG. 15 is a flowchart illustrating the searching processing in the image processing method performed by the image processing apparatus according to the second exemplary embodiment.

First, the CPU 301 inputs data of a model pyramid (image model) from the storage apparatus such as the HDD 304 or the external storage apparatus 800 in which the data of the model pyramid (image model) is stored (S61).

Then, the CPU 301 generates a target object pyramid which includes a plurality of target object images having different reduction ratios (having different resolutions) and in which the target object images are placed hierarchically so that the reduction ratio is increased (the resolution is reduced) as being advanced to the upper layer from the lower layer. In the present exemplary embodiment, the target object pyramid is generated so as to have the same reduction ratio and the same number of layers as those of the model pyramid.

Specifically, first, the CPU 301 causes the camera 500 to capture an image of a detection target object, and inputs a captured image acquired by imaging of the camera 500 (S62: image capturing step).

Next, the CPU 301 regards the input captured image as a target object image which is not reduced, and reduces the target object image for the number of layers of the pyramid (S63 and S64). The image reduction is performed in a similar to that of steps S3 and S4 in FIG. 3. With the steps S62 to S64 described above, the CPU 301 generates a target object pyramid formed by the captured image (target object image which is not reduced) and a plurality of images (target object images) which are obtained by reduction in a stepwise manner (target object pyramid generation step, target object pyramid generation processing).

Next, the CPU 301 performs pattern matching processing by using the model pyramid and the target object pyramid such that a model image is searched for from the target object image in the layer with the same resolution by determining a degree of dissimilarity (also referred to as nonconformity) (S65). The CPU 301 performs this pattern matching processing for all layers (target object images) of the target object pyramid (S66).

Specifically, first, the pattern matching is performed between images with a largest reduction ratio, that is, images in each of the top layers. When the pattern matching is completed, the pattern matching is performed between images with a next largest reduction ratio, that is, images in each of the immediately lower layers. When the pattern matching is finally completed between images which are not reduced, that is, images in each of the bottom layers, the processing is ended. In this manner, the pattern matching processing is performed in the order from the layer with the low resolution (layer with the high reduction ratio) to the layer with the high resolution (layer with the low reduction ratio).

The CPU 301 decides, as a position of the detection target object, a candidate point at which the lowest degree of dissimilarity is obtained among candidate points extracted by the pattern matching processing for the model image and the target object image in each of the bottom layers at steps S65 and S66 (S67: decision step). Note that, when there is eventually one candidate point, the candidate point is decided as the position of the detection target object.

The CPU 301 outputs an image processing result of step S67 to the robot control apparatus 400. The robot control apparatus 400 controls the robot 200 on the basis of the image processing result to implement an assembling step of causing the robot 200 to hold the detection target object, that is, the work W1 so as to be assembled to the work W2 which is a receiving member. As a result, the assembly W is produced.

Figure 16:
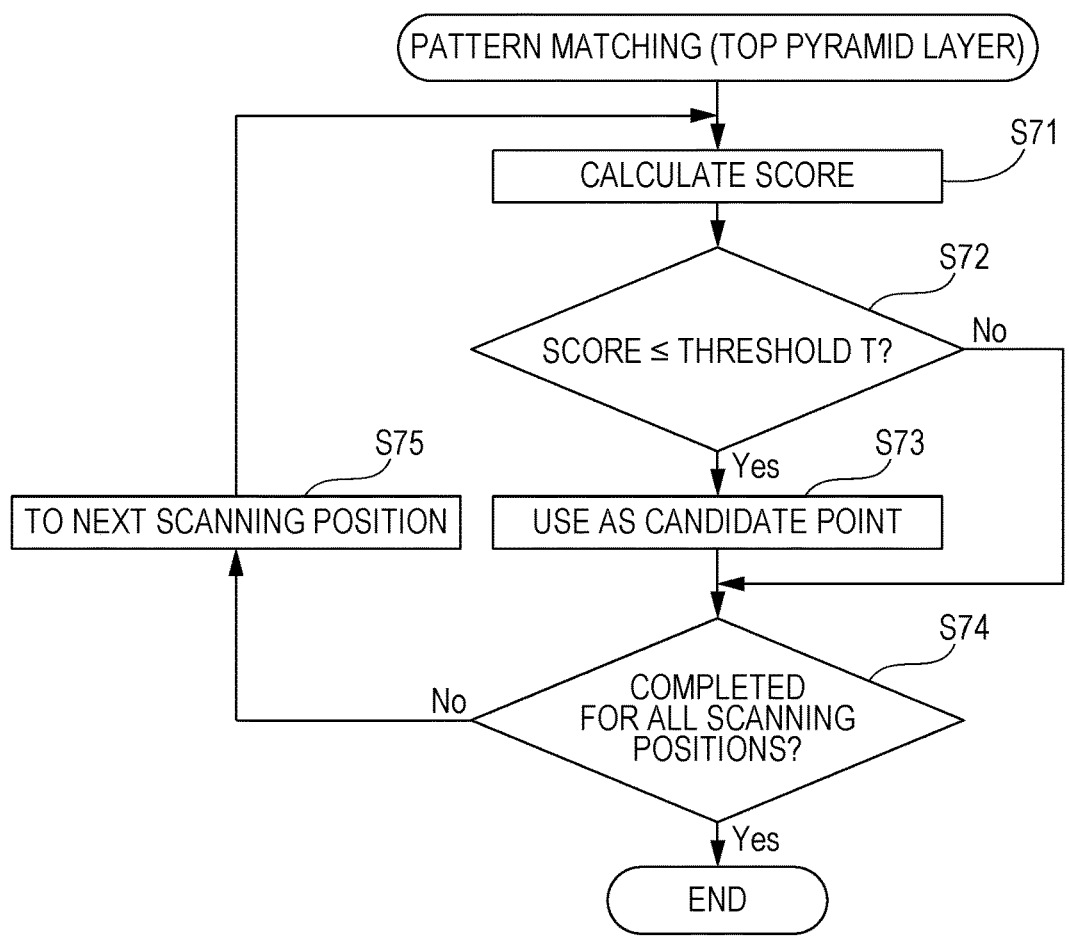
FIG. 16 is a flowchart illustrating pattern matching processing in the image processing method according to the second exemplary embodiment.
Figure 17:
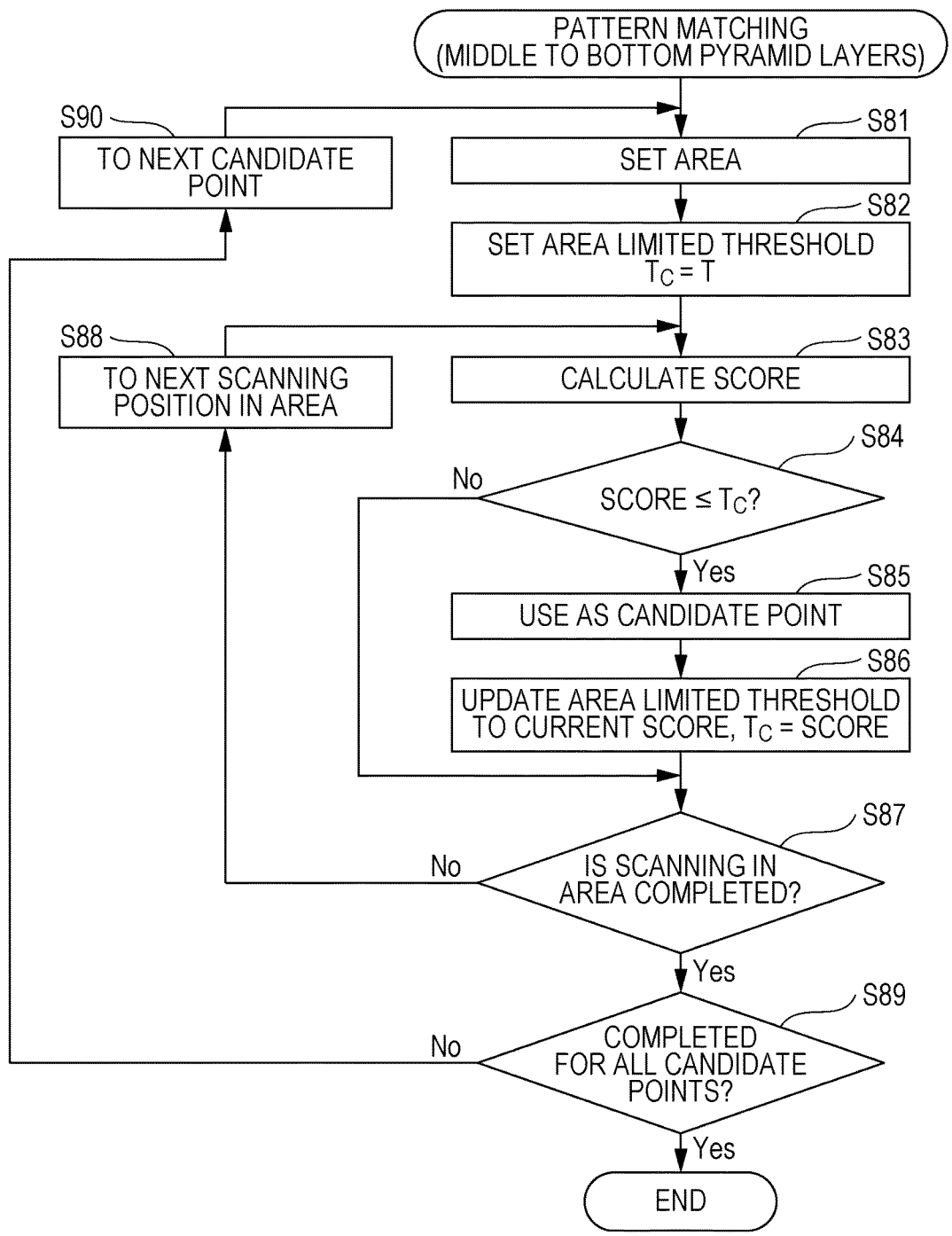
FIG. 17 is a flowchart illustrating the pattern matching processing in the image processing method according to the second exemplary embodiment.

Next, the pattern matching processing at step S65 will be described in detail. FIGS. 16 and 17 are flowcharts illustrating the pattern matching processing in the image processing method performed by the image processing apparatus according to the second exemplary embodiment. Note that, FIG. 16 illustrates the pattern matching processing in the top pyramid layer, and FIG. 17 illustrates the pattern matching processing in the middle to bottom pyramid layers.

The CPU 301 performs scanning with a model image in the top layer of the model pyramid by one pixel at a time in the x-axis and y-axis directions within a target object image in the top layer of the target object pyramid and extracts an image (extracted image) having the same size as that of the model image from the target object image.

The CPU 301 calculates a score to determine the degree of dissimilarity between the extracted image and the model image (S71). Next, the CPU 301 determines whether or not the score (degree of dissimilarity) obtained as a result of the score calculation is equal to or smaller than a threshold T which is set in advance (S72). The threshold T is a fixed value and a value stored in advance in the storage apparatus such as the HDD 304 is used therefor. The score (degree of dissimilarity) of 0 indicates that the model image and the target object image are matched, and a larger value indicates that they are not matched. That is, as the value of the degree of dissimilarity is great, the images are different from each other (not similar to each other).

When determining that the score (degree of dissimilarity) is equal to or smaller than the threshold (S72: Yes), the CPU 301 uses a scanning position, at which the extracted image is extracted, as a candidate point (S73).

The CPU 301 causes the storage apparatus such as the HDD 304 or the external storage apparatus 800 to store the candidate point. Note that, when determining that the degree of dissimilarity exceeds the threshold (S72: No), the CPU 301 determines that there is no candidate point and directly shifts to processing at step S74.

The CPU 301 determines whether or not the score calculation is completed for all scanning positions (S74). When the score calculation is not completed for all scanning positions (S74: No), the CPU 301 performs scanning with (moves) the model image to a next scanning position (S75), extracts an image at that scanning position, and returns to step S71 for performing the score calculation. When the score calculation for all scanning positions in the target object image is completed (S74: Yes), the processing for the top pyramid layer is ended.

As described above, in the present exemplary embodiment, with steps S71 to S75, the CPU 301 performs scanning with the model image in the top layer for the target object image in the top layer, and extracts candidate points at each of which the score (degree of dissimilarity) equal to or smaller than the threshold is obtained (first extraction step, first extraction processing). That is, the first extraction processing for performing scanning with the model image for the entire target object image to extract the candidate points is performed for the target object image in the top layer among the target object images in the layers upper than the target object image in the bottom layer. In the first extraction processing, the calculation of the degree of similarity is not terminated during the calculation.

Next, pattern matching processing for the middle to bottom pyramid layers will be described with reference to FIG. 17. In the present exemplary embodiment, the same pattern matching processing is performed for the target object images in the layers (middle and bottom layers) lower than the target object image in the top layer.

Similarly to the first exemplary embodiment, the patter matching processing will be described with reference to FIG. 12. Description will be given by assuming that a plurality of candidate points $P_{41}$ and $P_{42}$ are extracted from the target object image $I_{S4}$.

Here, a candidate point has not been extracted from the target object images $I_{S1}$ to $I_{S3}$ in the layers lower than the target object image $I_{S4}$ from which candidate points have been already extracted. Thus, candidate points are extracted from the target object image $I_{S3}$ in the layer immediately lower than the target object image $I_{S4}$.

First, the CPU 301 sets, in the target object image $I_{S3}$, an area $R_{31}$ which includes a point $Q_{31}$ at a position corresponding to the candidate point $P_{41}$ extracted from the target object image $I_{S4}$ in the layer immediately upper than the target object image $I_{S3}$ (S81: setting step, setting processing). That is, when the pyramid layer is lowered by one layer, the point $Q_{31}$ corresponding to the position (i, j) of the candidate point $P_{41}$ is at a position (2×i, 2×j) having coordinates twice the greater than the coordinates (i, j). The CPU 301 sets the neighboring area $R_{31}$ including 5×5 pixels centered at the corresponding point $Q_{31}$ (2×i, 2×j) in the target object image $I_{S3}$. The area to be set in this manner is not limited to the area including 5×5 pixels, and may be changed in a range of 2×2 pixels to 10×10 pixels, for example.

Next, the CPU 301 sets an initial value of an area limited threshold $T_C$ which is used limitedly in the area set at step S81, that is, the area $R_{31}$ (S82: setting step, setting processing). In the present exemplary embodiment, the initial value of the area limited threshold $T_C$ is set to the same value as the threshold T.

Next, the CPU 301 performs scanning with a model image $I_{S3}$ (representative point) in the area $R_{31}$ set at step S81, and extracts candidate points at each of which the degree of dissimilarity equal to or smaller than the area limit threshold $T_C$ is obtained (S83 to S88: second extraction step, second extraction processing).

Specifically, first, the CPU 301 extracts, from the target object image $I_{S3}$, an image obtained when scanning is performed with the representative point of the model image $I_{T3}$ on one point in the area $R_{31}$. Then, the CPU 301 performs score calculation (calculation of the degree of dissimilarity) between the extracted image and the model image $I_{T3}$ (S83). The score calculation is performed in a similar manner to that of step S71.

The CPU 301 determines whether or not the score (degree of dissimilarity) calculated at step S83 is equal to or smaller than the area limited threshold $T_C$ (S84).

When the score is equal to or smaller than the area limited threshold $T_C$ (S84: Yes), the CPU 301 uses the scanning position as a candidate point (S85). At this time, the CPU 301 stores this candidate point in the storage apparatus such as the HDD 304 or the external storage apparatus 800. When data of the candidate point for the area $R_{31}$ has been already stored in the storage apparatus, the data is overwritten by data of the new candidate point. That is, when a score smaller than the area limited threshold $T_C$ is calculated multiple times through scanning (searching) in one area $R_{31}$, the candidate point which has been stored is overwritten each time.

Note that, when the calculated score has the same value as the area limited threshold $T_C$ and data of the candidate point for the area $R_{31}$ has been already stored in the storage apparatus, data of the new candidate point may be stored additionally without deleting the data of the candidate point which has been already stored. That is, a plurality of candidate points having the same score are extracted from one area $R_{31}$.

The CPU 301 updates the area limited threshold $T_C$ with the calculated score (degree of dissimilarity) (S86). As a result, the value of the area limited threshold $T_C$ decreases for each updating. That is, the area limited threshold $T_C$ is updated to the value smaller than the initial value. Note that, when the score has the same value as the area limited threshold $T_C$ as a result of the determination at step S84, updating does not need to be performed. In any case, when the degree of dissimilarity for which the calculation is completed has a value smaller than the current area limited threshold $T_C$, the CPU 301 updates the area limited threshold $T_C$, which is used for a next scanning position, with the degree of dissimilarity having a value smaller than the current area limited threshold $T_C$.

When the calculated score exceeds the area limited threshold $T_C$ (S84: No), the CPU 301 determines that there is no candidate point and shifts to next processing of step S87.

Next, the CPU 301 determines whether or not scanning (searching) in the area $R_{31}$ is completed (S87).

When determining that scanning in the area $R_{31}$ is not completed (S87: No), the CPU 301 moves the model image to a next scanning position in the area $R_{31}$ (S88), and returns to the processing of step S83.

When determining that scanning in the area $R_{31}$ is completed (S87: Yes), the CPU 301 determines whether or not the processing is completed for all candidate points (S89). When determining that the processing is not completed (S89: No), the CPU 301 selects a next candidate point, for example, the candidate point $P_{42}$ (S90), and returns to the processing of step S81.

That is, in a similar manner also for the next candidate point $P_{42}$, the CPU 301 sets an area $R_{32}$ which includes a point $Q_{32}$ at a position corresponding to the candidate point $P_{42}$ in the target object image $I_{S3}$ (S81), and sets the area limited threshold $T_C$ which is used limitedly in the area $R_{32}$ (S82). An initial value of the area limited threshold $T_C$ in this case is set (initialized) to the same value as the threshold T. The CPU 301 then performs following processing of S83 to S88. When determining that scanning in the area $R_{32}$ is completed at step S87, the CPU 301 determines whether or not the processing is completed for all candidate points (S89). When determining that the processing is completed (S89: Yes), the CPU 301 ends the pattern matching processing in the current layer, that is, the target object image $I_{S3}$.

In this manner, the CPU 301 sets, in the target object image $I_{S3}$, the areas $R_{31}$ and $R_{32}$ and the area limited thresholds $T_C$ used limitedly in the areas $R_{31}$ and $R_{32}$ respectively to points at positions corresponding to the candidate points $P_{41}$ and $P_{42}$ extracted from the target object image $I_{S4}$, that is, the points $Q_{31}$ and $Q_{32}$. Then, the CPU 301 performs scanning with the model image for the areas $R_{31}$ and $R_{32}$, and extracts candidate points $P_{31}$ and $P_{32}$, at each of which the degree of dissimilarity equal to or smaller than the area limited threshold $T_C$ is obtained.

Note that, even when the areas $R_{31}$ and $R_{32}$ are overlapped with each other, for example, the degree of dissimilarity is calculated in a duplicated manner for the overlapping part by performing scanning in the areas $R_{31}$ and $R_{32}$.

The pattern matching processing in the target object image $I_{S3}$ in the remaining middle layer and the pattern matching processing in the target object image $I_{S1}$ in the remaining bottom layer are also performed similarly.

That is, the CPU 301 sets, in the target object image $I_{S3}$, areas $R_{21}$ and $R_{22}$ and the area limited thresholds $T_C$ respectively to points $Q_{21}$ and $Q_{22}$ at positions corresponding to the candidate points $P_{31}$ and $P_{32}$ extracted from the target object image $I_{S3}$ in the layer immediately upper than the target object image $I_{S3}$. Then, the CPU 301 performs scanning with the model image in the areas $R_{21}$ and $R_{22}$, and extracts candidate points $P_{21}$ and $P_{22}$, at each of which the degree of dissimilarity equal to or smaller than the area limited threshold $T_C$ is obtained. Similarly, the CPU 301 sets, in the target object image $I_{S1}$, areas $R_{11}$ and $R_{12}$ and the area limited thresholds $T_C$ respectively to points $Q_{11}$ and $Q_{12}$ at positions corresponding to the candidate points $P_{21}$ and $P_{22}$ extracted from the target object image $I_{S3}$ in the layer immediately upper than the target object image $I_{S1}$. Then, the CPU 301 performs scanning with the model image in the areas $R_{11}$ and $R_{12}$, and extracts candidate points $P_{11}$ and $P_{12}$, at each of which the degree of dissimilarity equal to or smaller than the area limited threshold $T_C$ is obtained.

As described above, as the processing of steps S65 and S66 illustrated in FIG. 15, the processing of steps S71 to S75 of FIG. 16 is performed in the top pyramid layer, and the processing of steps S81 to S90 of FIG. 17 is performed in the middle to bottom pyramid layers.

The CPU 301 decides, as a detected position of an object in the target object image $I_{S1}$, a position of the candidate point having a lowest score value (degree of dissimilarity) of the candidate points $P_{11}$ and $P_{12}$ extracted in the bottom layer at step S67.

Figure 18:
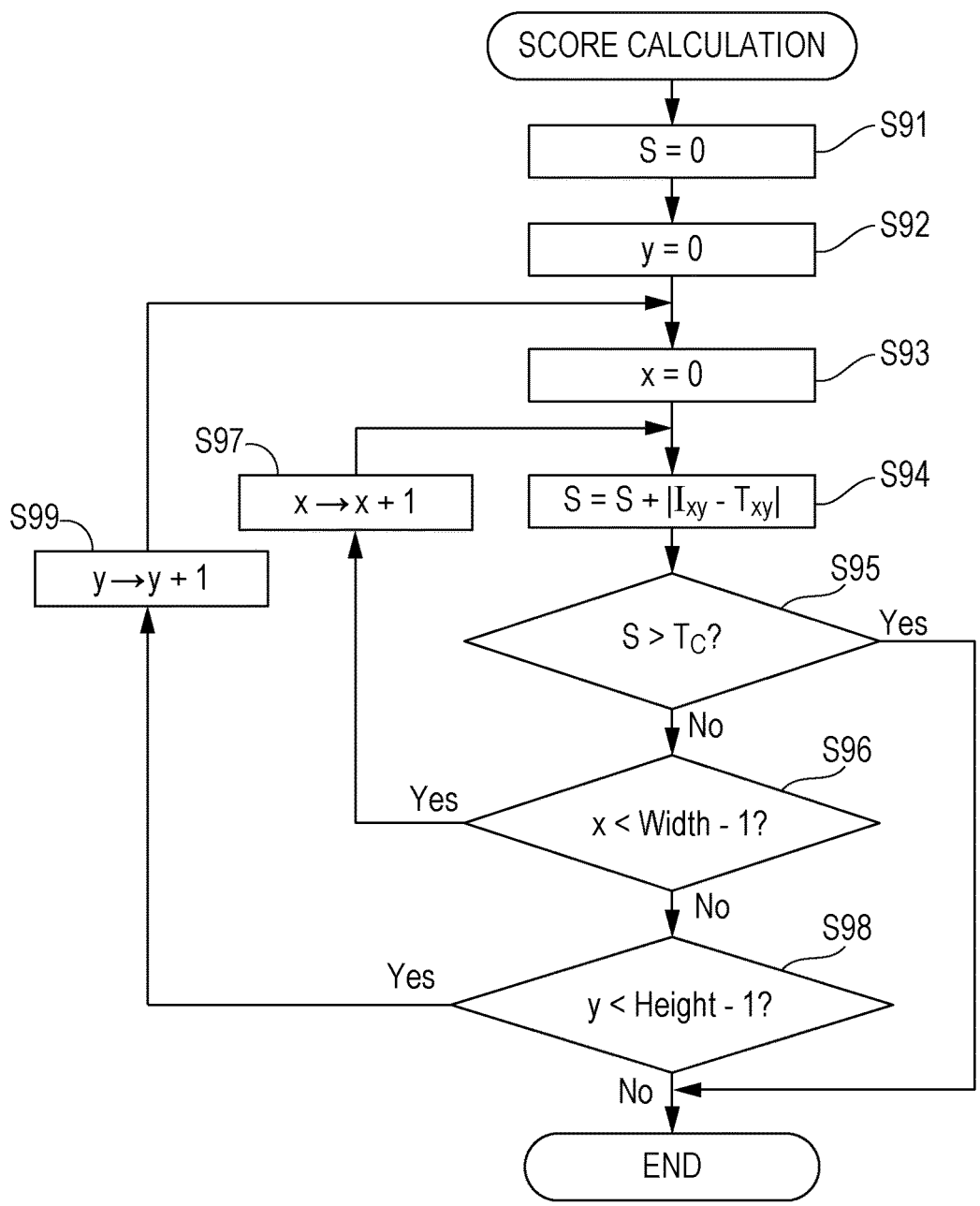
FIG. 18 is a flowchart illustrating score calculation processing in the image processing method according to the second exemplary embodiment.

Next, processing of score calculation (calculation of the degree of dissimilarity) at step S71 of FIG. 16 and step S81 of FIG. 17 will be described in detail. FIG. 18 is a flowchart illustrating score calculation processing (degree of dissimilarity calculation processing) in the image processing method performed by the image processing apparatus according to the second exemplary embodiment.

First, the CPU 301 obtains a luminance difference between an extracted image, which is obtained by extracting an image having a size corresponding to a model image from a target object image, and the model image. Specifically, first, the CPU 301 initializes a value of a score (degree of dissimilarity S) to 0 (S91). Then, the CPU 301 initializes values of corresponding coordinates (x, y) of the extracted image extracted from the target object image and the model image to 0 (S92 and S93). When an image width and an image height of the extracted image and the model image are respectively set as Width and Height, a position of the corresponding coordinates, x=0 and y=0, is in the upper left of the image and a position of x=Width−1 and y=Height−1 is the lower right of the image.

The CPU 301 calculates a difference between a luminance value $I_{xy}$ of the coordinates (x, y) of the extracted image extracted from the target object image and a luminance value $T_{xy}$ of the coordinates (x, y) of the model image, and adds an absolute value of the difference to the score S (S94).

The CPU 301 determines whether or not score calculation is able to be terminated in accordance with the area limited threshold $T_C$ (S95). That is, the CPU 301 predicts whether or not the degree of dissimilarity has a value greater than the area limited threshold $T_C$ on the basis of an interim result of the calculation of the degree of dissimilarity during the calculation of the degree of dissimilarity.

When the score S is equal to or smaller than the area limited threshold $T_C$ (S95: No), that is, when the CPU 301 is not able to predict that the degree of dissimilarity has a value greater than the area limited threshold $T_C$, the CPU 301 continues the score calculation and determines whether or not the coordinate x is smaller than Width−1 (S96). When determining that the coordinate x is smaller than Width−1 (S96: Yes), the CPU 301 increments the coordinate x by one (S97) and returns to the processing of S94 for obtaining a luminance difference for a next position.

When the coordinate x is Width−1 (S96: No), the CPU 301 determines whether or not the coordinate y is smaller than Height−1 (S98). When determining that the coordinate y is smaller than Height−1 (S98: Yes), the CPU 301 increments the coordinate y by one (S99) and returns to the processing of S93 for obtaining a luminance difference for a next line.

That is, when the CPU 301 is not able to predict that the degree of dissimilarity has a value greater than the area limited threshold $T_C$, the CPU 301 continues the calculation of the degree of dissimilarity. When the coordinate y is Height−1 (S98: No), the CPU 301 completes the calculation of the score (degree of dissimilarity). In this manner, a sum of absolute values of the luminance differences between the extracted image extracted from the target object image and the model image is calculated, and a value of the sum is used as the score (degree of dissimilarity).

When predicting that the score S has a value greater than the area limited threshold $T_C$ during the calculation described above (S95: Yes), the CPU 301 terminates the score calculation and ends the score calculation.

As described above, according to the second exemplary embodiment, when the pattern matching processing is performed in the middle and bottom pyramid layers, the area limited threshold $T_C$ which is used for each area to terminate the score calculation is updated. Thus, it is possible to shorten a processing time required for the pattern matching by terminating the calculation of the degree of dissimilarity and updating the area limited threshold used for determining whether or not to terminate the calculation.

Further, since it is possible to determine whether to terminate the score calculation in accordance with the area limited threshold $T_C$ which is set separately for each area without being affected by the degree of dissimilarity calculated in other areas, thus making it possible to prevent failure in detection of an object.

Note that, a case where termination of the calculation of the degree of dissimilarity and updating of the area limited threshold $T_C$ are performed for all the target object images $I_{S1}$ to $I_{S3}$ other than the target object image $I_{S4}$ in the top layer has been described in the second exemplary embodiment, but there is no limitation thereto.

For example, termination of the calculation of the degree of dissimilarity and updating of the area limited threshold $T_C$ may be performed only for the target object image $I_{S1}$ in the bottom layer, or termination of the calculation of the degree of dissimilarity and updating of the area limited threshold $T_C$ may be performed only for the target object image $I_{S2}$ or the target object image $I_{S3}$ in the middle layer. In this case, for the target object image in the layer (hierarchy) in which termination of the calculation of the degree of dissimilarity and updating of the area limited threshold $T_C$ are not performed, it is only required that the degree of dissimilarity is determined in accordance with the threshold T to extract a candidate point. Further, for the target object image in the layer (hierarchy) in which termination of the calculation of the degree of dissimilarity and updating of the area limited threshold $T_C$ are not performed, an area including a point corresponding to the candidate point in the upper layer may be set to perform scanning with the model image only in the area. Of course, it is possible to reduce the processing time more effectively when termination of the calculation of the degree of dissimilarity and updating of the area limited threshold $T_C$ are performed for all the target object image $I_{S1}$ to $I_{S3}$ other than the target object image $I_{S4}$.

When the area limited threshold $T_C$ is updated, that is, when the degree of dissimilarity is below the area limited threshold $T_C$, data of a candidate point in the corresponding area is updated (data is overwritten), but there is no limitation thereto and the data of the candidate point which is registered before may be kept. Of course, updating of data of the candidate point needs less amount of data and makes it possible to reduce the processing time effectively.

In the second exemplary embodiment, though the degree of dissimilarity is calculated from a sum of absolute values of the difference of luminance values between the target object image and the model image, the degree of dissimilarity may be calculated from a sum of squares of the difference of luminance values.

Though a case where the degree of dissimilarity (also referred to as nonconformity) is calculated has been described in the second exemplary embodiment, a degree of similarity (also referred to as conformity) may be calculated. That is, determination according to the degree of dissimilarity (nonconformity) is equal to determination according to the degree of similarity (conformity), and even when the degree of dissimilarity is used, the same is provided as when the degree of similarity is used (even though whether to be greater or smaller than the threshold is determined in an inverted manner).

The invention is not limited to the exemplary embodiments described above, and many modifications are possible within the scope of the technical idea of the invention. Further, the effects described in the exemplary embodiments of the invention are no more than an enumeration of the most favorable effects that arise from the invention, and effects by the invention are not limited to the effects described in the exemplary embodiments of the invention.

Other Exemplary Embodiments

Exemplary embodiments of the invention is able to be realized by processing in which a program which realizes one or more functions of the exemplary embodiments described above is supplied to a system or an apparatus via a network or a storage medium and one or more processors in a computer of the system or the apparatus read out and execute the program. Further, the exemplary embodiments of the invention is also able to be realized by a circuit (for example, an ASIC) which realizes one or more functions.

According to the present disclosure, it is possible to shorten a processing time required for pattern matching by terminating calculation of a degree of similarity and updating an area limited threshold used for determining whether or not to terminate the calculation. Since the area limited threshold is set for each area corresponding to a candidate point, it is possible to prevent failure of detection of an object.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-245758, filed on Dec. 17, 2015, which is hereby incorporated by reference herein in its entirety.

What is claimed is:

1. An image processing method, comprising:
generating a plurality of target object images so that a reduction ratio is increased as being advanced to a second image from a first image;
extracting, in a first extraction, a plurality of first candidate points at which a degree of similarity is greater than a predetermined value by performing scanning with a model image on the first image;
setting, in the second image, search areas around respective positions corresponding to the plurality of first candidate points;
extracting, in a second extraction, second candidate points at which the degree of similarity is greater than an area threshold by performing scanning with the model image on the search areas,
wherein, in the second extraction, degrees of similarity are calculated independently for the respective search areas, and, in the respective search areas, the calculation of the degree of similarity is terminated, if it is predicted that a result of the calculation is smaller than the area threshold.

2. The image processing method according to claim 1, further comprising deciding, as a position of a detection target, a candidate point, at which a highest degree of similarity is obtained, among the second candidate points extracted at the second extraction.

3. The image processing method according to claim 1, wherein, in the second extraction, a scan position at which the highest degree of similarity calculated inside the search areas is updated is extracted as the second candidate point.

4. The image processing method according to claim 1, wherein the plurality of target object images is a target object pyramid, and
the target object pyramid is constituted by an edge image obtained by extracting an edge from a captured image as a result of capturing of an image of a detection target object and a reduced image obtained by reducing the edge image.

5. The image processing method according to claim 4, wherein the target object pyramid is constituted by a captured image as a result of capturing of an image of a detection target object and a reduced image obtained by reducing the captured image.

6. The image processing method according to claim 4, further comprising:
generating a model pyramid in which a plurality of target object images are placed hierarchically so that a reduction ratio is increased as being advanced to an upper layer from a lower layer,
wherein the processing unit generates the target object pyramid which has the same reduction ratio and the same number of layers as those of the model pyramid in generation of the target object pyramid.

7. An image processing apparatus, comprising
a processing unit that implements:
generating a plurality of target object images so that a reduction ratio is increased as being advanced to a second image from a first image;
extracting, in a first extraction, a plurality of first candidate points at which a degree of similarity is greater than a predetermined value by performing scanning with a model image on the first image;
setting, in the second image, search areas around respective positions corresponding to the plurality of first candidate points;
extracting, in a second extraction, second candidate points at which the degree of similarity is greater than an area threshold by performing scanning with the model image on the search areas,
wherein, in the second extraction, degrees of similarity are calculated independently for the respective search areas, and, in the respective search areas, the calculation of the degree of similarity is terminated, if it is predicted that a result of the calculation is smaller than the area threshold.

8. An image processing system, comprising:
an image processing apparatus comprising a processing unit for generating a plurality of target object images so that a reduction ratio is increased as being advanced to a second image from a first image;
the processing unit extracting, in a first extraction, a plurality of first candidate points at which a degree of similarity is greater than a predetermined value by performing scanning with a model image on the first image;
the processing unit setting, in the second image, search areas around respective positions corresponding to the plurality of first candidate points;
the processing unit extracting, in a second extraction, second candidate points at which the degree of similarity is greater than an area threshold by performing scanning with the model image on the search areas,
wherein, in the second extraction, degrees of similarity are calculated independently for the respective search areas, and, in the respective search areas, the calculation of the degree of similarity is terminated, if it is predicted that a result of the calculation is smaller than the area threshold; and
an image capturing apparatus that captures an image of a detection target.

9. A production apparatus, comprising:
a robot,
an image processing apparatus comprising a processing unit for generating a plurality of target object images so that a reduction ratio is increased as being advanced to a second image from a first image;
the processing unit extracting, in a first extraction, a plurality of first candidate points at which a degree of similarity is greater than a predetermined value by performing scanning with a model image on the first image;
the processing unit setting, in the second image, search areas around respective positions corresponding to the plurality of first candidate points;
the processing unit extracting, in a second extraction, second candidate points at which the degree of similarity is greater than an area threshold by performing scanning with the model image on the search areas,
wherein, in the second extraction, degrees of similarity are calculated independently for the respective search areas, and, in the respective search areas, the calculation of the degree of similarity is terminated, if it is predicted that a result of the calculation is smaller than the area threshold; and a robot control apparatus that controls the robot on the basis of an image processing result by the processing unit of the image processing apparatus.

10. A non-transitory recording medium in which a program is recorded, the program causing a computer to execute the steps of the image processing method according to claim 1.

11. The image processing method according to claim 1, wherein, in the second extraction, a value of the highest degree of similarity to be used in extracting the second candidate points in the search areas is updated each time the calculated highest degree of similarity in the search area is updated.

12. The image processing method according to claim 1, wherein, in the second extraction, in a case where the highest degree of similarity calculated in a predetermined search area from among the search areas when the second candidate point is extracted from the search area is not updated at the time of subsequent calculations of the degrees of similarity, the calculation of the degree of similarity in the search area is terminated.

13. The image processing method according to claim 2, wherein the deciding is performed in the target object image.

14. The image processing apparatus according to claim 7, wherein, in the second extraction, a value of the highest degree of similarity to be used in extracting the second candidate points in the search areas is updated each time the calculated highest degree of similarity in the search area is updated.

15. The image processing apparatus according to claim 7, wherein, in the second extraction, in a case where the highest degree of similarity calculated in a predetermined search area from among the search areas when the second candidate point is extracted from the search area is not updated at the time of subsequent calculations of the degrees of similarity, the calculation of the degree of similarity in the search area is terminated.

16. A method for manufacturing an article by assembling the article to another article using the production apparatus according to claim 9.

17. The image processing method according to claim 4, wherein the second extraction is performed for the target object image in a bottom layer of the target object pyramid.

18. The image processing method according to claim 4, wherein the processing unit performs the second extraction for a target object image between the target object image in a bottom layer and a target object image in a top layer of the target object pyramid.

* * * * *